(12) United States Patent
Cho et al.

(10) Patent No.: US 9,171,450 B2
(45) Date of Patent: Oct. 27, 2015

(54) EMERGENCY HANDLING SYSTEM USING INFORMATIVE ALARM SOUND

(71) Applicant: QUALCOMM Incorporated, San Diego, CA (US)

(72) Inventors: Yongwoo Cho, Seoul (KR); Taesu Kim, Seongnam (KR); Minho Jin, Gyeonggi-do (KR); Kyu Woong Hwang, Taejon (KR); Seong Ill Park, Seongnam (KR); Hyun-Mook Cho, Seoul (KR); Duck-Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/012,662

(22) Filed: Aug. 28, 2013

(65) Prior Publication Data

US 2014/0253326 A1 Sep. 11, 2014

Related U.S. Application Data

(60) Provisional application No. 61/775,182, filed on Mar. 8, 2013, provisional application No. 61/775,220, filed on Mar. 8, 2013.

(51) Int. Cl.
*G08B 1/08* (2006.01)
*G08B 25/10* (2006.01)
*H04W 4/22* (2009.01)

(52) U.S. Cl.
CPC ...... *G08B 25/10* (2013.01); *H04W 4/22* (2013.01)

(58) Field of Classification Search
CPC ..... A61B 5/0002; G08B 25/016; G08B 25/10
USPC ........................................ 340/539.11, 539.13
See application file for complete search history.

(56) References Cited

U.S. PATENT DOCUMENTS

| | | | | |
|---|---|---|---|---|
| 5,652,570 | A * | 7/1997 | Lepkofker | 340/573.4 |
| 6,028,514 | A * | 2/2000 | Lemelson et al. | 340/539.13 |
| 6,198,914 | B1 | 3/2001 | Saegusa | |
| 6,894,612 | B2 * | 5/2005 | Xydis | 340/539.11 |
| 7,221,928 | B2 * | 5/2007 | Laird et al. | 455/404.1 |
| 7,821,389 | B2 * | 10/2010 | Houde et al. | 340/539.11 |
| 7,904,053 | B2 | 3/2011 | Krasner et al. | |
| 8,116,723 | B2 | 2/2012 | Kaltsukis | |
| 8,680,989 | B2 * | 3/2014 | George | 340/539.22 |
| 2003/0069002 | A1 * | 4/2003 | Hunter et al. | 455/404 |
| 2008/0132199 | A1 | 6/2008 | Hirata | |
| 2009/0085873 | A1 * | 4/2009 | Betts et al. | 345/169 |
| 2009/0197566 | A1 | 8/2009 | Ito | |
| 2010/0190468 | A1 * | 7/2010 | Scott et al. | 455/404.2 |
| 2010/0286490 | A1 * | 11/2010 | Koverzin | 600/301 |
| 2011/0071880 | A1 | 3/2011 | Spector | |
| 2011/0136463 | A1 | 6/2011 | Ebdon et al. | |
| 2012/0302200 | A1 | 11/2012 | Esbensen | |
| 2013/0103309 | A1 | 4/2013 | Cai et al. | |
| 2013/0183924 | A1 * | 7/2013 | Saigh et al. | 455/404.2 |

OTHER PUBLICATIONS

International Search Report and Written Opinion for International Application No. PCT/US2013/057386, mailed Jan. 24, 2014, 12 pages.

* cited by examiner

*Primary Examiner* — Eric M Blount
(74) *Attorney, Agent, or Firm* — Toler Law Group, PC

(57) ABSTRACT

A method includes receiving an alarm sound including information related to an emergency event. The method also includes transmitting, to a server, identification information of the mobile device and the information. The method further includes receiving, from the server, an instruction for responding to the emergency event. The method further includes outputting the instruction.

61 Claims, 32 Drawing Sheets

EMERGENCY HANDLING SYSTEM USING INFORMATIVE ALARM SOUND

CLAIM OF PRIORITY

This application claims priority from U.S. Provisional Patent Application No. 61/775,182 filed on Mar. 8, 2013 and entitled "METHOD AND APPARATUS FOR REQUESTING ASSISTANCE IN EMERGENCY EVENT," and claims priority from U.S. Provisional Patent Application No. 61/775,220 filed on Mar. 8, 2013 and entitled "EMERGENCY HANDLING SYSTEM USING INFORMATIVE ALARM SOUND," the contents of each of which are incorporated herein in their entirety.

TECHNICAL FIELD

The present disclosure relates generally to communicating information related to an emergency event. More specifically, the present disclosure relates to a method and system for communicating information related to an emergency event to provide an instruction for responding to the emergency event using a mobile device.

BACKGROUND

Alarm devices such as sirens or bells have been widely used to indicate an emergency situation such as a fire or burglary. When an emergency situation arises, the alarms devices typically operate to generate loud alarm sounds. In general, the sound generated by an alarm device is designed to be easily perceived by people so that they can be immediately alerted to the emergency situation and take appropriate actions for safety.

In an actual emergency situation, the original emergency event that triggered the alarm sound may not be clear to those in the vicinity of the emergency. Further, the location of the source of the emergency such as a fire may not be immediately apparent to those near the emergency. For example, despite an alarm sound, people in the vicinity of the emergency may not be able to identify a burglary as the cause of the alarm sound. Similarly, the location of a fire may not be readily identifiable due to smoke. Accordingly, people perceiving an alarm may not have a clear understanding of the emergency situation to respond appropriately.

Moreover, a person in an emergency situation may not be familiar with the location or a building in which an alarm is triggered. In such case, a person may try to obtain information on such location or building through a mobile device. However, such an effort may result in a delay in responding to the emergency situation. Further, even with knowledge of such location or building, a person in the emergency situation may not be able to respond appropriately due to panic or an emergency condition such as smoke from a fire.

Thus, there is a need for a method and system for communicating information on an emergency event to allow a mobile device to provide an instruction for responding to the emergency event.

Recently, the use of mobile devices such as smartphones and tablet computers has become widespread. These devices typically provide a voice and data communication capability over wireless networks. In addition, such devices typically include other features or applications that provide a variety of functions designed to enhance user convenience.

One such feature is a voice call function in which a mobile device may call a phone number in response to receiving a voice command from a user. This feature allows the user to call a desired phone number without physically entering the number by hand on the mobile device. Accordingly, the voice call function may be used to call a phone number in a variety of situations in which the user may not be able to physically input the number by hand.

The voice call function may allow a user of a mobile device to make a call in an emergency situation. When the user has been injured in an accident such as a fall, a vehicular accident, or the like, the user may call a phone number for assistance using the voice call function of the mobile device. For example, if the user is unable to physically operate the mobile device due to injury, the user may speak a command such as "CALL 911" to the mobile device to seek assistance. However, voice call functions may be triggered unintentionally by erroneous recognition of a voice command. An erroneous call to an emergency number, e.g., 911, is particularly undesirable. Such an erroneous call wastes the resources of the emergency service as well as subjecting the user to potential penalties.

SUMMARY

The present disclosure provides methods and apparatus for communicating information on an emergency event. In these methods and apparatus, when an emergency event occurs, the mobile device may receive an alarm sound including information related to the emergency event. In response to the emergency event, the mobile device can receive an instruction for responding to the emergency event.

According to an aspect of the present disclosure, a method for responding to an emergency event on a mobile device is disclosed. The mobile device receives an alarm sound including information related the emergency event. Then, the mobile device transmits to a server identification information of the mobile device and the information related to the emergency event. An instruction for responding to the emergency event from the server is then received by the mobile device. Lastly, the mobile device outputs the instruction. This disclosure also describes an apparatus, a combination of means, and a computer-readable medium relating to this method.

According to an aspect of the present disclosure, a method for a server to provide assistance in an emergency event is disclosed. The server receives, from a first mobile device, information related to the emergency event and identification information of the first mobile device. The information is included in an alarm sound at the first mobile device. The server then generates a first instruction for responding to the emergency event for the first mobile device based on the information related to the emergency event and the identification information of the first mobile device, and transmits the first instruction to the first mobile device.

According to an aspect of the present disclosure, a mobile device for responding to an emergency event is disclosed. The mobile devices includes a sound sensor configured to receive an alarm sound including information related to the emergency event, and a communication unit configured to transmit, to a server, identification information of the mobile device and the information related to the emergency event. Further, the mobile device includes a receiving unit configured to receive an instruction for responding to the emergency event from the server, and an output unit configured to output the instruction.

According to an aspect of the present disclosure, a server for providing assistance in an emergency event is disclosed. The server includes a receiving unit configured to receive, from a first mobile device, information related to the emergency event and identification information of the first mobile device. The information is included in an alarm sound at the first mobile device. The server further includes a processor configured to generate a first instruction for responding to the emergency event for the first mobile device based on the information related to the emergency event and the identification information of the first mobile device, and a transmitting unit configured to transmit the first instruction to the first mobile device.

According to an aspect of the present disclosure, a system for providing assistance in an emergency event is disclosed. The system includes an alarm device configured to output an alarm sound including information related to the emergency event, and a first mobile device configured to receive the alarm sound, and transmit the information related to the emergency event and identification information of the first mobile device. Further, the system includes a server configured to receive the information related to the emergency event and the identification information of the first mobile device, and generate a first instruction for responding to the emergency event for the first mobile device, the server being further configured to transmit the first instruction to the first mobile device.

According to another aspect of the present disclosure, a system for providing assistance in an emergency event is disclosed. The system includes a first mobile device configured to receive an alarm sound including information on the emergency event, and a second mobile device operable to communicate with the first mobile device, and configured to receive, from the first mobile device, the instruction for responding to the emergency event for the second mobile device. In the system, the first mobile device generates the instruction based on identification information of the second mobile device and the information on the emergency event.

According to an aspect of the present disclosure, a method for responding to an emergency event is disclosed. In the method, an alarm device detects an emergency event and generates an alarm sound that includes information related to the emergency event. The information related to the emergency event includes an alarm ID of the alarm device and an emergency code for the emergency event. The method further includes transmitting, by the alarm device, the information related to the emergency event to a server. Then, the server alerts at least one mobile device in a predetermined distance from the alarm device of the emergency event.

According to one aspect of the present disclosure, a method is performed in a mobile device for requesting assistance. According to the method, the mobile device receives an input sound and determines whether the input sound matches a predetermined emergency keyword indicating a request for the assistance in an emergency event. If the input sound is determined to match the predetermined emergency keyword, the request for the assistance is verified. Upon verification of the request for the assistance, the mobile device connects to an emergency server for the assistance. Further, the method may include storing the predetermined emergency keyword in the mobile device based on a user input. This disclosure also describes an apparatus, a device, a system, a combination of means, and a computer-readable medium relating to the method.

According to another aspect of the present disclosure, a method is performed in an emergency server for providing assistance in an emergency event. In accordance with the method, the emergency server receives from a mobile device a request for assistance and at least one of user information, location information, and context information. The method verifies the request for assistance by transmitting a query to the mobile device and receiving a response to the query from the mobile device. If the request for assistance is verified, the emergency server connects the mobile device to a communication device for providing the assistance. Further, the method may include receiving, from the mobile device, communication information of a contact to be notified in the emergency event, and notifying the contact of the emergency event. This disclosure also describes an apparatus, a device, a system, a server, a combination of means, and a computer-readable medium relating to the method.

According to another aspect of the present disclosure, a mobile device includes a sound sensor, a speech recognition unit, and a communication unit. The sound sensor is configured to receive an input sound. The speech recognition unit is configured to verify a request for assistance based on whether the input sound matches a predetermined emergency keyword indicating the request for assistance. The communication unit is configured to connect to an emergency server for assistance if the request for assistance is verified.

According to yet another aspect of the present disclosure, an emergency server includes a communication unit, a speech recognition unit, and a connection unit. The communication unit is configured to receive, from a mobile device, a request for assistance and at least one of user information, location information, and context information. The speech recognition unit is configured to verify the request for assistance based on a query transmitted to the mobile device and based on a response to the query received from the mobile device. The connection unit is configured to selectively connect the mobile device to a communication device to provide assistance, based on whether the request for assistance is verified.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
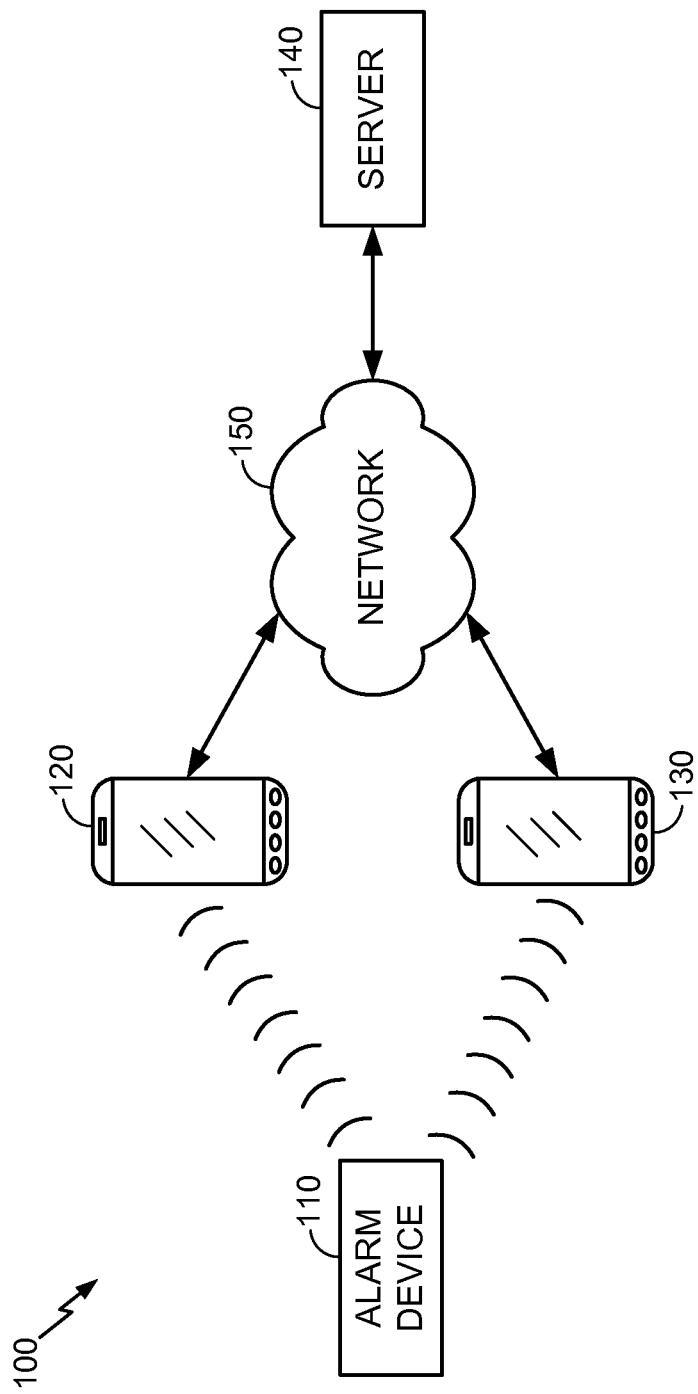
FIG. 1 illustrates mobile devices configured to receive an alarm sound indicating an emergency event from an alarm device and to output an instruction received from a server for responding to the emergency event according to one embodiment of the present disclosure.

FIG. 1 illustrates a communication system 100 in which mobile devices 120 and 130 may be configured to receive an alarm sound indicating an emergency event from an alarm device 110 and output an instruction received from a server 140 for responding to the emergency event via a network 150 according to one embodiment of the present disclosure. In the communication system 100, the alarm device 110 may be configured to generate an alarm sound including an audible sound and an audio-watermark sound in response to an emergency event. The audible sound may include a siren, a bell, and any other type of audible warning sounds. The audio-watermark sound may include a digital code that identifies an alarm device and/or a type of emergency. For example, the audio-watermark sound may include information such as an alarm device ID to identify the location of an alarm device and an emergency code identifying the type of emergency such as fire, earthquake, hurricane, burglary, etc. Additional information may be included in the audio-watermark sound. In one embodiment, the audio-watermark sound in the alarm sound may be in an audible or inaudible frequency range. In one embodiment, the audio-watermark sound may be in a near-ultrasound frequency range between 18 kHz and 21 kHz, which is near the upper limit of typical human hearing capacity and can be detected by microphones included in conventional mobile devices. In another embodiment, the alarm device 110 may output only the inaudible audio-watermark sound.

When an emergency event is detected, the alarm device 110 generates and outputs an alarm sound including the audio-watermark sound. For example, in response to fire, the alarm device 110 may generate an alarm sound with an audio-watermark sound including an alarm device ID of the alarm device 110 and an emergency code for the fire. The mobile devices 120 and 130, which are located within the vicinity of the alarm device 110, are configured to receive the alarm sound. Once the alarm sound including the audio-watermark sound is received, each of the mobile devices 120 and 130 extracts the alarm device ID of the alarm device 110 and the emergency code from the alarm sound. At this time, the mobile devices 120 and 130 may output a notification of the emergency event to alert users of the mobile devices 120 and 130. In this case, the notification may be in the form of a vibration, a sound, and/or a display to indicate the location of the alarm device 110 and/or the type of the emergency event.

After extracting the alarm device ID of the alarm device 110 and the emergency code, the mobile devices 120 and 130 are configured to transmit information on the emergency event along with identification information of the respective mobile devices 120 and 130 to the server 140. In one embodiment, the information on the emergency event includes the alarm device ID of the alarm device 110 and the emergency code. In another embodiment, the mobile devices 120 and 130 may directly transmit the received alarm sound as an audio file to the server 140. The identification information of the mobile device 120 or 130 includes a location of the mobile device, a mobile device identification number, a call back number, and/or any other information that may be used to identify or locate the mobile device.

The mobile devices 120 and 130 may be any suitable device such as a cellular phone, a smartphone, a laptop computer or a tablet personal computer equipped with sound capturing capability, e.g., a microphone, and/or communications capability through a data and/or communications network, where the sound signal may be an audible or inaudible sound signal. The mobile devices 120 and 130 may be a portable computing device such as a tablet PC, a smartphone, a gaming device, and the like, and may include any standard components and functions of such devices.

The server 140 receives the information on the emergency event and the identification information of the mobile devices 120 and 130 via the network 150. The server 140 is configured to analyze the received information and generate an instruction for responding to the emergency event for each of the mobile devices 120 and 130. For processing the received information, the server 140 may include a plurality of databases such as an alarm device ID database, an emergency code database, a map database, and a context database for emergency events.

Based on such databases and received information, the server 140 may generate an instruction for responding to the emergency event for users of the mobile devices 120 and 130. For example, in the case of a fire, the server 140 accesses a map database for the alarm device 110 based on the alarm device ID database and the emergency code. The map database may include a floor plan in which the alarm device 110 is located. The server 140 analyzes the location information of the mobile device 120 or 130 and the map database, and generates an instruction for evacuation. In some embodiments, the server 140 may receive context information such as a surrounding temperature, photographs, or sound of the mobile devices 120 or 130. The received context information may be compared with the context database to determine the severity of the emergency event near the mobile device 120 or 130 in generating an instruction to the mobile devices.

After generating an instruction for each of the mobile devices 120 and 130, the server 140 transmits the respective instructions to the mobile devices 120 and 130 via the network 150. The mobile devices 120 and 130 then output the respective instructions to respective users for responding to the emergency event in the form of a sound and/or a display. Although the communication system 100 is illustrated using the mobile devices 120 and 130, the communication system 100 may any number of mobile devices that can receive an alarm sound. It should also be understood that the functions of the mobile devices 120 and 130 as discussed above may be incorporated in any suitable mobile devices described in this disclosure.

Figure 2:
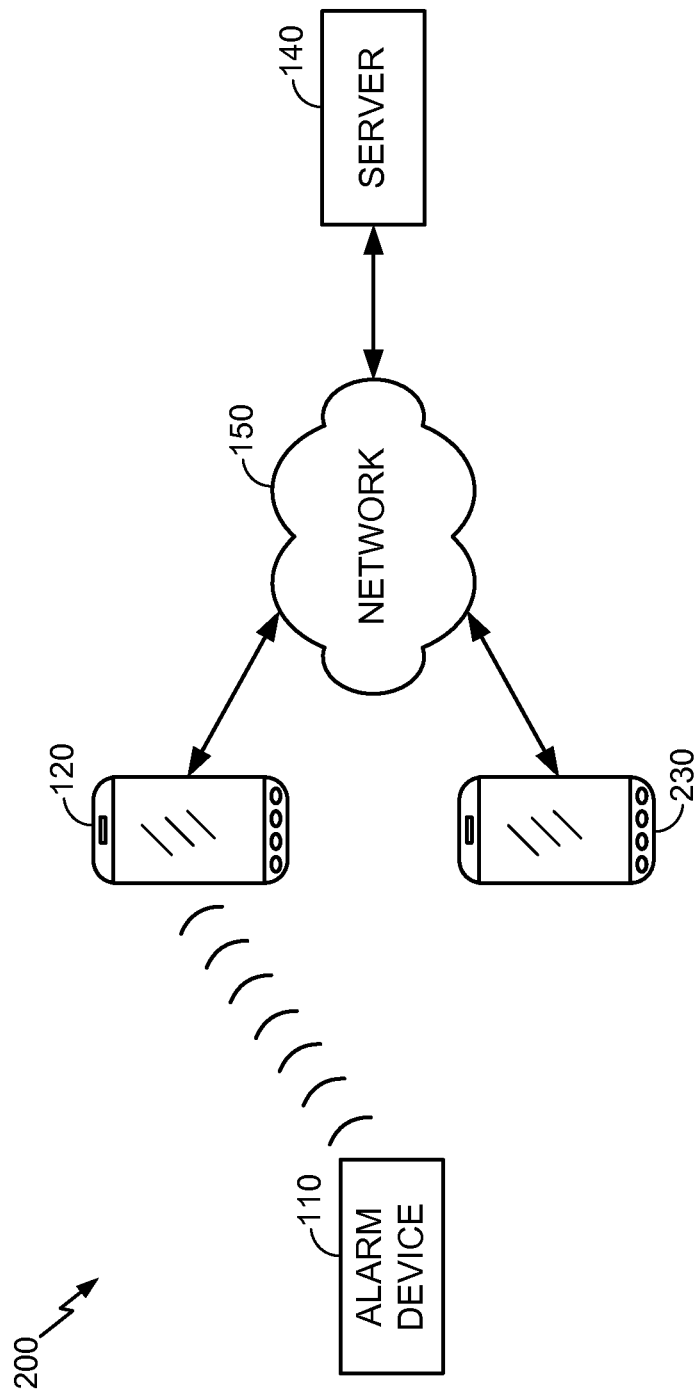
FIG. 2 illustrates a mobile device configured to communicate with a server to receive and output an instruction for responding to an emergency event based on an alarm sound received by another mobile device according to one embodiment of the present disclosure.

In some embodiments, a mobile device may not be able to receive or process an alarm sound that includes an audio-watermark sound. FIG. 2 illustrates a communication system 200 in which a mobile device 230 may be configured to communicate with the server 140 in order to receive and output an instruction for responding to an emergency event based on an alarm sound received by the mobile device 120 according to one embodiment of the present disclosure. The alarm device 110 is configured to generate and output the alarm sound to the mobile device 120. In another embodiment, the alarm sound may reach the mobile devices 120 and 230, but the mobile device 230 is not equipped to receive or process the audio-watermark sound. Alternatively, the mobile device 230 may not be sufficiently close to the alarm device 110 to receive the alarm sound of a sufficient intensity level. As such, only the mobile device 120 may be able to notify a user of the mobile device 120 with the emergency event.

The mobile device 120 receives and output the information on the mobile device, and transmits the information indicating the emergency event along with identification information of the mobile device 120 to the server 140 via the network 150. The server 140 analyzes the information indicating the emergency event and the identification information of the mobile device 120, and determines a safety instruction for the mobile device 120. The instruction is transmitted to the mobile device 120 to be output for the user of the mobile device 120.

In the case of the mobile device 230, once the server 140 receives the information on the emergency event, the server 140 communicates with the network 150 to obtain identification information of other mobile devices in the vicinity of the location of the emergency event. In one embodiment, the network 150 may include a base station and/or a Wi-Fi access point, which is near the location of the emergency event and is configured to provide a network access to the mobile device 230, which is not capable of receiving or processing the alarm sound. The network 150 then transmits identification and location information of the mobile device 230 to the server 140. In another embodiment, the server 140 may broadcast a request for identification information for other mobile devices in the vicinity of the location of the emergency event. In response to the request, the mobile device 230 may transmit its identification and location information to the server 140. The server 140 then analyzes and determines an instruction for responding to the emergency event for the mobile device 230. The instruction is then transmitted to the mobile device 230 to be output for the user of the mobile device 230.

Figure 3:
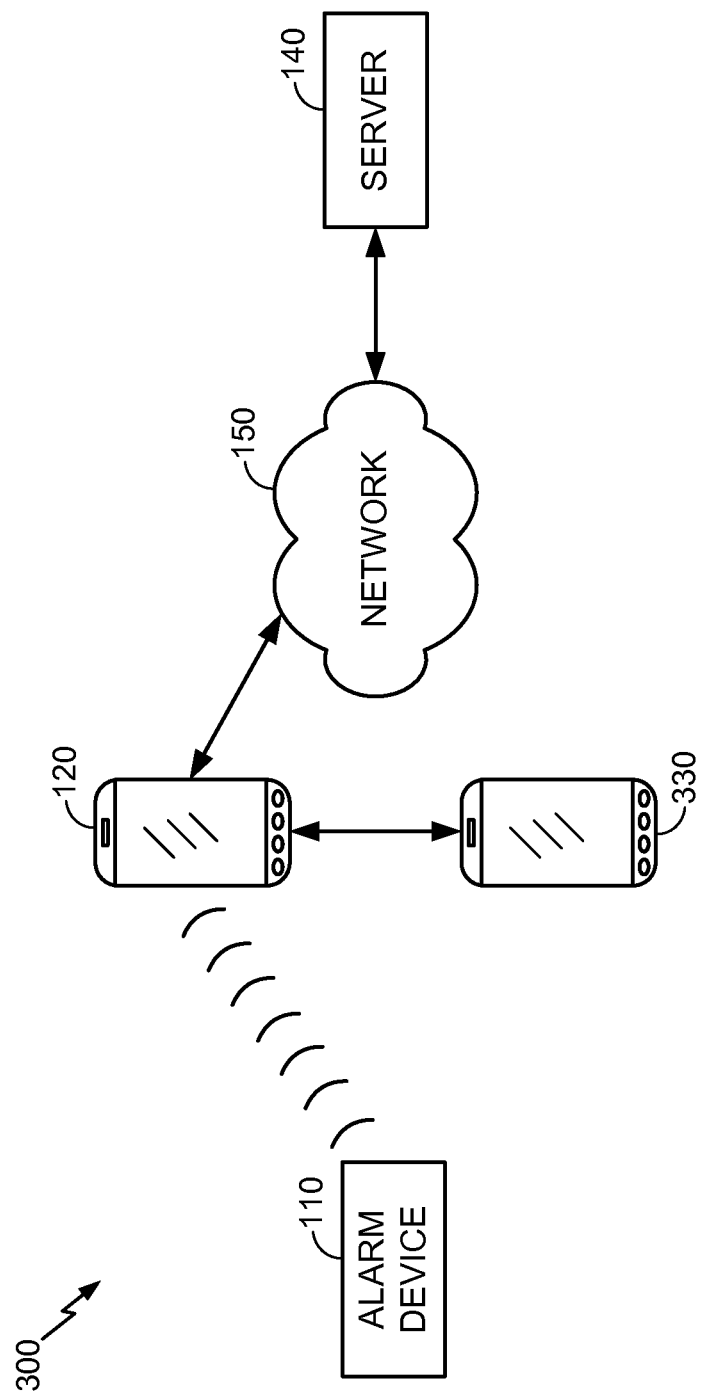
FIG. 3 illustrates a mobile device configured to communicate with another mobile device to receive and output an instruction for responding to an emergency event according to one embodiment of the present disclosure.

In some embodiments, a mobile device may receive an instruction for responding to an emergency event from the mobile device 120 in a peer-to-peer (P2P) relationship. FIG. 3 illustrates a communication system 300 in which a mobile device 330 is configured to communicate with the mobile device 120 to receive and output an instruction for responding to an emergency event according to one embodiment of the present disclosure. In the illustrated embodiment, the mobile device 330 is not configured to receive and/or process the alarm sound with an audio-watermark sound, and does not have access to the network 150. Instead, the mobile device 330 is configured to communicate with the mobile device 120 in a P2P network, which may implement any suitable P2P network technologies such as Bluetooth, LTE direct, and Wi-Fi direct. In the P2P network, the mobile device 330 may communicate with the mobile device 120, which is in the vicinity of the mobile device 330, for receiving information on the emergency event and an instruction for responding to the emergency event.

As described in connection with FIG. 1 above, the alarm device 110 is configured to generate and output an alarm sound with an audio-watermark sound to the mobile device 120 upon detecting an emergency event. When the mobile device 120 receives the alarm sound including the audio-watermark sound that indicates the emergency event, the mobile device 120 may transmit to the server 140 its identification information together with information on the emergency event included in the audio-watermark sound or directly transmit the received alarm sound as an audio file. The server 140 may determine and transmit an instruction for responding to the emergency event for the mobile device 120, as described above.

From the audio-watermark sound, the mobile device 120 determines the location of the alarm device 110 and the type of the emergency event, which are transmitted to the mobile device 330. In response, the mobile device 330 transmits its identification information (e.g., a location of the mobile device, a mobile device identification number, and a call back number) to the mobile device 120 to be transmitted to the server 140. Alternatively, the identification information of the mobile device 330 may have already been received by the mobile device 120 through a recent P2P communication. The server 140 is configured to receive from the mobile device 120 the identification information of the mobile device 330. Based on the information indicating the emergency event and the identification information of the mobile device 330, the server 140 determines and transmits an instruction for responding to the emergency event for a user of the mobile device 330 to the mobile device 120. The instruction for the mobile device 330 is then transmitted from the mobile device 120 to the mobile device 330 in a P2P communication.

Figure 4:
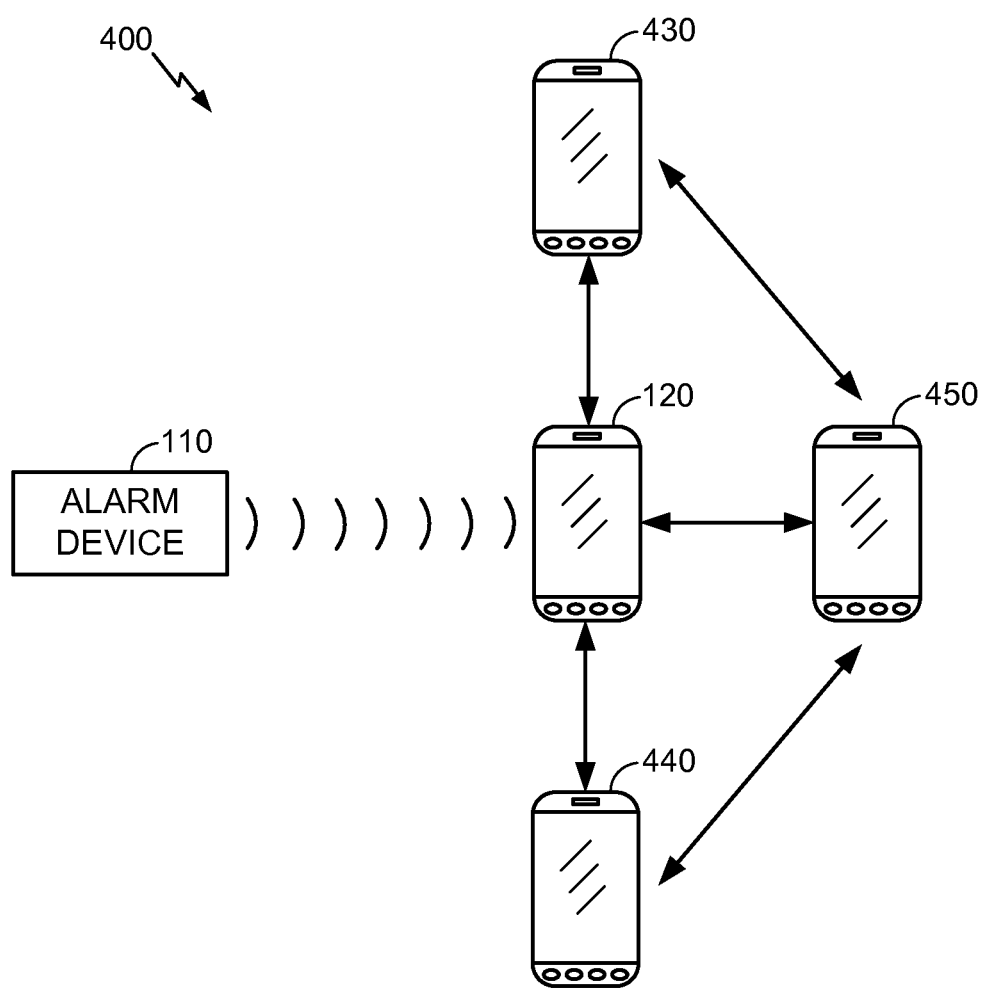
FIG. 4 illustrates a mobile device configured to receive an alarm sound indicating an emergency event and to transmit an instruction for responding to an emergency event to a plurality of other mobile devices according to one embodiment of the present disclosure.

In another embodiment, a mobile device may determine an instruction for responding an emergency event for at least one other mobile device in response to an alarm sound. FIG. 4 illustrates a communication system 400 in which the mobile device 120 is configured to receive an alarm sound and generate an instruction for responding to an emergency event for each of a plurality of mobile devices 430 to 450 according to one embodiment of the present disclosure. In this embodiment, the mobile devices 120 and 430 to 450 are located in a geographically proximate location and may communicate with each other through a P2P network. Among the mobile devices 120 and 430 to 450, the mobile device 120 is configured to receive and process the alarm sound including an audio-watermark sound while the mobile devices 430 to 450 lack such a feature.

In addition to receiving and processing the alarm sound, the mobile device 120 also provides the functions of the server 140 for generating an instruction for responding to an emergency event. When the mobile device 120 receives the alarm sound with the audio-watermark sound including information indicating an emergency event, the mobile device 120 transmits the information on the emergency event to the plurality of mobile devices 430 to 450 over the P2P network. In response, the mobile devices 430 to 450 transmit their identification information to the mobile device 120. Based on the identification information of the mobile devices 430 to 450 and the information on the emergency event, the mobile device 120 may generate an instruction for responding to the emergency event for each of the mobile device 430 to 450. The instructions are then transmitted to the respective mobile devices 430 to 450 from the mobile device 120. In another embodiment, the server functions of the mobile device 120 may instead be provided by at least one of the plurality of mobile devices 430 to 450. For example, the mobile device 430 may be configured with the server functions. In this case, the mobile device 430 determines an instruction for responding to the emergency event for each of the mobile devices 120 and 430 to 450 and transmits a respective instruction to each of the other mobile devices 120, 440 and 450.

Figure 5:
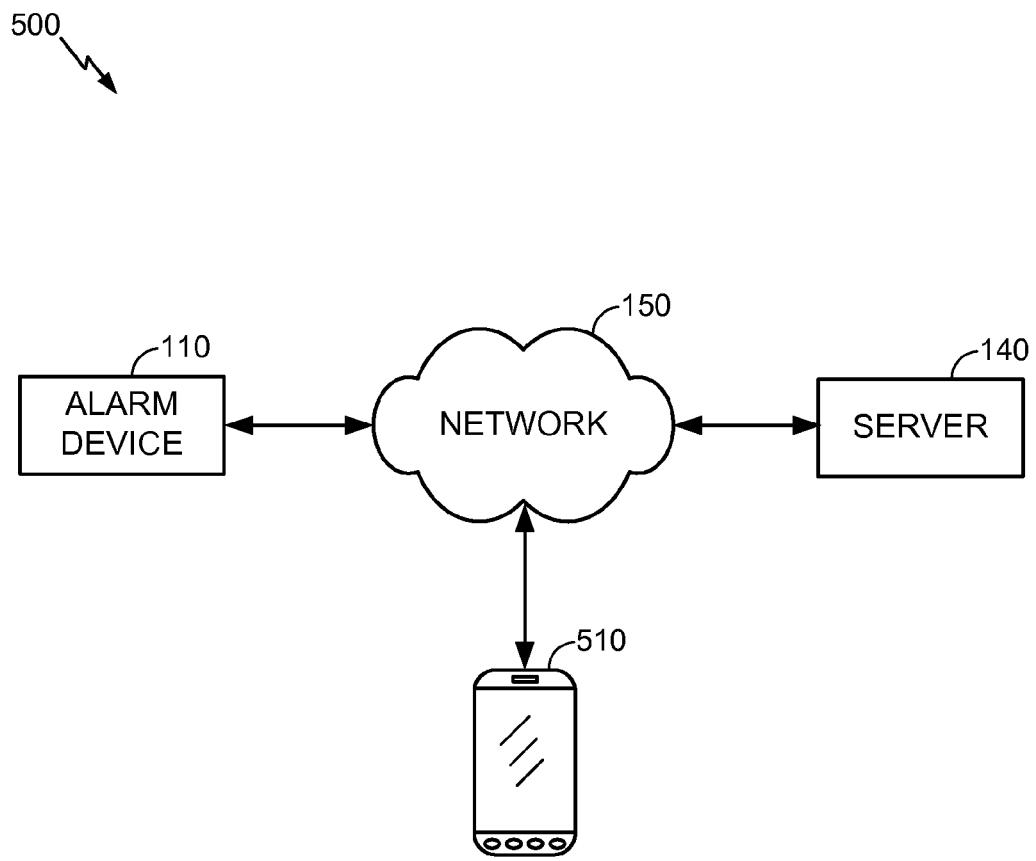
FIG. 5 illustrates a mobile device configured to respond to an emergency event in communication with a server which receives emergency information from an alarm device according to one embodiment of the present disclosure.

In another embodiment, an alarm device may be equipped with a network interface to provide sound data on an emergency event to a server. A mobile device may then receive an instruction for responding to the emergency event from the server. FIG. 5 illustrates a mobile device 510 configured to receive an instruction for responding to an emergency event from the server 140 via the network 150 when the server 140 receives emergency information from the alarm device 110 according to one embodiment of the present disclosure.

When an emergency event is detected, the alarm device 110 generates sound data including its alarm device ID and an emergency code for the emergency event. The alarm device 110 is then configured to transmit the sound data to the server 140 via the network 150. In this embodiment, the network 150 may include any network apparatus configured to provide network access to mobile devices, such as a base station and/or a Wi-Fi access point. Once the server 140 receives the sound data, the server 140 determines the location of the alarm device 110 based on the alarm device ID, and communicates with the network 150 to find mobile devices located in the vicinity of the location of the alarm device 110. In one embodiment, the server 140 communicates with the network apparatus nearest the location of the alarm device 110 to find mobile devices that may access the network 150 through the network apparatus. For example, the server 140 may transmit a request to the network apparatus to send information on mobile devices located within its communication range. Alternatively, the server 140 may broadcast a request for identification information to mobile devices located in the vicinity of the alarm device 110 through the network apparatus.

In response, the network apparatus determines identification and location information of the mobile device 510, and transmits the information to the server 140. In this process, the network apparatus may have the identification and location information of the mobile device 510 from the most recent communication with the mobile device 510, or the network apparatus may communicate with the mobile device 510 to obtain its identification and location information. Based on the identification and location information of the mobile device 510, the server 140 determines an instruction for responding to the emergency event for the mobile device 510. The instruction is then transmitted to the mobile device 510 to be output on the mobile device 510.

Figure 6:
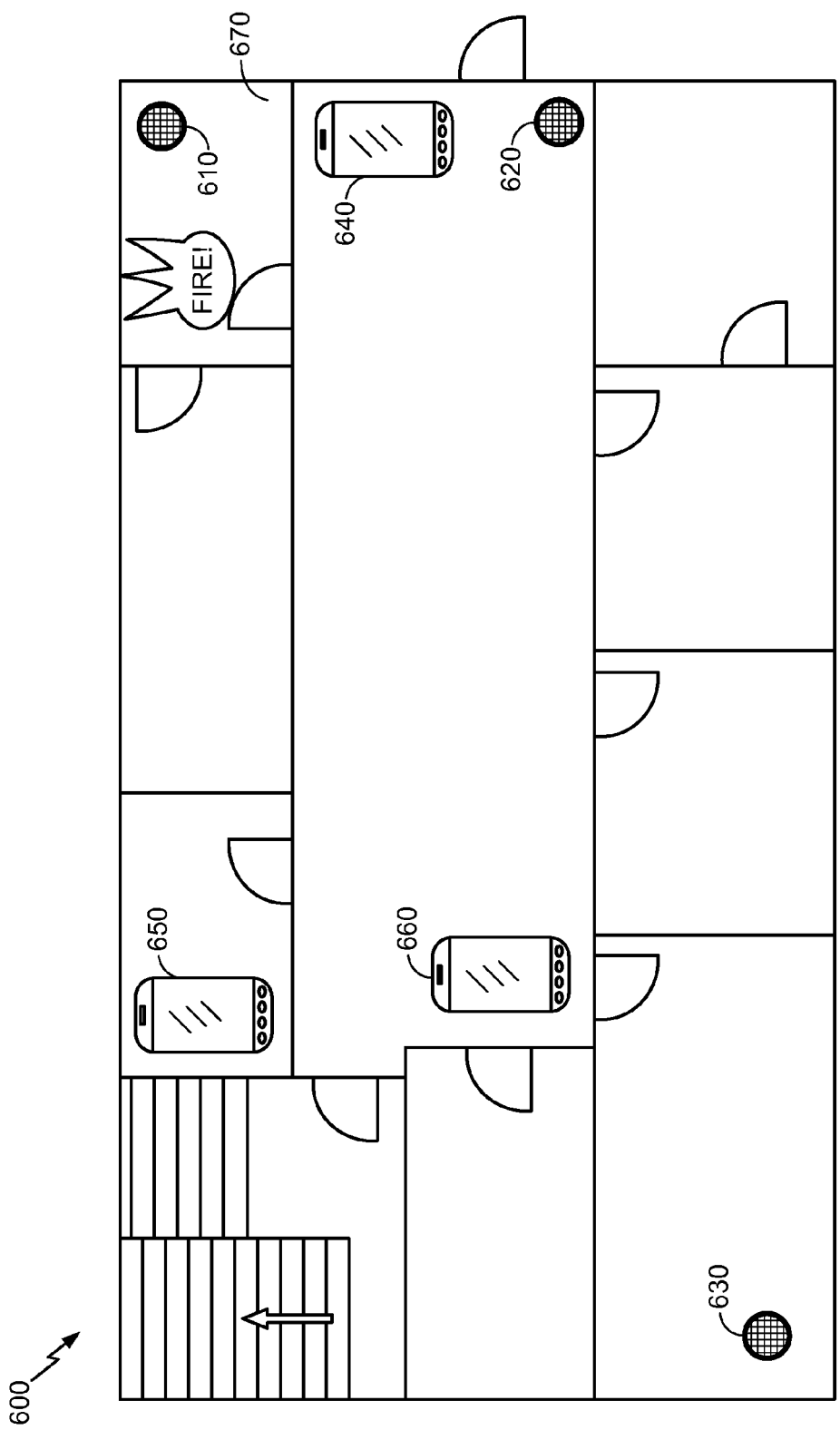
FIG. 6 illustrates a floor plan of a building in which a plurality of mobile devices and alarm devices are located according to one embodiment of the present disclosure.

FIG. 6 illustrates a floor plan 600 of a building with a plurality of mobile devices 640 to 660 and a plurality of alarm devices 610 to 630 according to one embodiment of the present disclosure. In response to an emergency event, each of the alarm devices 610 to 630 is configured to generate an alarm sound including an audible sound and an audio-watermark sound, which includes information on the emergency event such as an alarm device ID indicating its location and the type of the emergency event. In the illustrated embodiment, a fire is detected in a room 670 in which the alarm device 610 is located. In response to the fire, the alarm device 610 generates an alarm sound with an audible sound and an audio-watermark sound, which indicates that a fire broke out at the location of the alarm device 610.

The alarm devices 610 to 630 may be in communication with a control panel which controls the operations of the alarm devices 610 to 630. In the illustrated embodiment, the alarm device 610 detects a fire event, and transmits an emergency code for the fire to the control panel, which will then transmit the emergency code for the fire to the alarm devices 620 and 630. Upon receiving the emergency code for the fire, the alarm devices 620 and 630 generate and output an alarm sound including an audio-watermark. In this embodiment, the audio-watermark sound output from the alarm device 610 may not be transmitted to the mobile device 640 as the audio-watermark sound may not be able to travel beyond a wall. Thus, in this embodiment, the mobile device 640 receives and processes the alarm sound with the audio-watermark sound from the alarm device 620. Further, in this configuration, unlike the mobile device 640, the mobile devices 650 and 660 may not be equipped to receive or process the audio-watermark sound.

The mobile device 640 receives the alarm sound with the audio-watermark sound from the alarm device 620 and extracts the information on the emergency event from the audio-watermark sound. Based on the information on the emergency event, a notification of the fire is output on the mobile device 640 to alert its user. The mobile device 640 then transmits to a server the information on the emergency event and identification information of the mobile device 640 including a location, a call back number, and a mobile device identification number of the mobile device 640. Based on the information received from the mobile device 640, the server accesses a map of the floor plan 500 from a map database and determines an evacuation instruction including the map of the floor plan 600 for the mobile device 640. The evacuation instruction is then transmitted to the mobile device 640 for output. The user of the mobile device 640 may then follow the instruction for safe evacuation.

In the illustrated embodiment, the mobile device 650 is also configured to communicate with the server to receive an instruction for responding to the emergency event. After the server receives the information on the fire event from the mobile device 640, the server determines whether there are any mobile devices in the vicinity of the fire or the mobile device 640. For example, the server may receive information on mobile devices within a coverage area of a base station and/or an access point nearest to the mobile device 640 and/or the alarm device 620. If the server determines that the mobile device 650 is located in the same building where the fire is detected, the server transmits to the mobile device 650 the information on the fire event received from the mobile device 640 and sends a request to the mobile device 650 to transmit its identification information. Based on the information from the server, the mobile device 650 may output a notification of the fire in the building, and transmit its identification information to the server. The server then determines and transmits an instruction for responding to the fire for the user of the mobile device 650.

Further, the mobile device 660 may not be equipped to communicate with the server. Instead, the mobile device 660 is configured to communicate with the mobile device 650 via a P2P network. After the mobile device 650 receives the information on the fire event from the server, the mobile device 650 determines whether there are any mobile devices within a P2P coverage area of the mobile device 650. When the mobile device 650 determines that the mobile device 660 is located within the P2P coverage area of the mobile device 650, the mobile device 650 transmits to the mobile device 660 the information on the fire event received from the server and sends a request to the mobile device 660 to transmit its identification information. In this case, the mobile device 660 may output a notification of the fire in the building and transmit its identification information to the mobile device 650, which then transmits the identification information of the mobile device 660 to the server. The server determines an instruction for responding to the fire for the mobile device 660, and then transmits to the mobile device 660, via the mobile device 650, the instruction for the mobile device 660.

Figure 7:
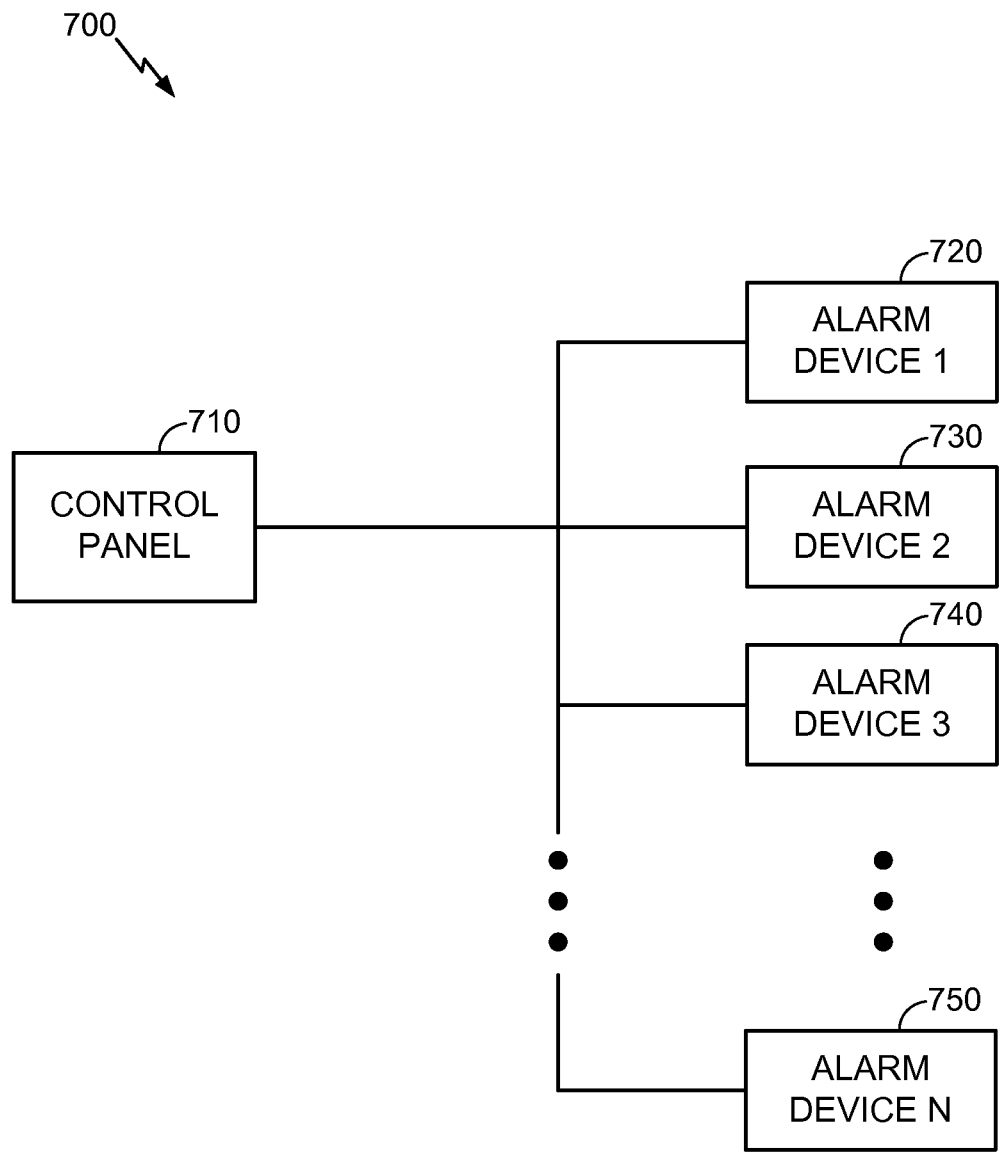
FIG. 7 illustrates a block diagram of an alarm system including a control panel and a plurality of alarm devices according to one embodiment of the present disclosure.

FIG. 7 illustrates a block diagram of an alarm system 700 including a control panel 710 and a plurality of alarm devices 720 to 750 that are configured to generate an alarm sound including an audio-watermark according to one embodiment of the present disclosure. The control panel 710 is coupled to communicate with and control the operations of the alarm devices 720 to 750. Each of the alarm devices 720 to 750 is configured to detect an emergency event, and generate an alarm sound including an audio-watermark specifying its alarm device ID and an emergency code.

In the alarm system 700, when an emergency event is detected by one of the alarm devices 720 to 750, the alarm device generates an alarm sound including an audio-watermark and transmits its alarm device ID and an emergency code for the emergency event to the control panel 710. For example, if the alarm device 720 detects a fire, it sends an emergency code for the fire to the control panel 710 which transmits the emergency code for the fire to the other alarm devices 730 to 750. Upon receiving the emergency code, each of the alarm devices 730 to 750 may generate and output an alarm sound including an audio-watermark specifying its alarm device ID and the emergency code for the fire.

In another embodiment, the control panel 710 may transmit an emergency code and a location for the emergency event. For example, if the alarm device 730 detects a fire, it becomes a first detector of the event and sends its alarm device ID and an emergency code for the fire to the control panel 710. In this case, the alarm device ID of the alarm device 730 is considered as the fire location. The control panel 710 then transmits the alarm device ID of the alarm device 730 and the emergency code for the fire to the alarm device 720. Then, upon receiving the emergency code and the alarm device ID of the alarm device 730, the alarm device 720 may generate and output an alarm sound including an audio-watermark specifying its alarm device ID, the emergency code for the fire, and the alarm device ID of the alarm device 730.

Figure 8:
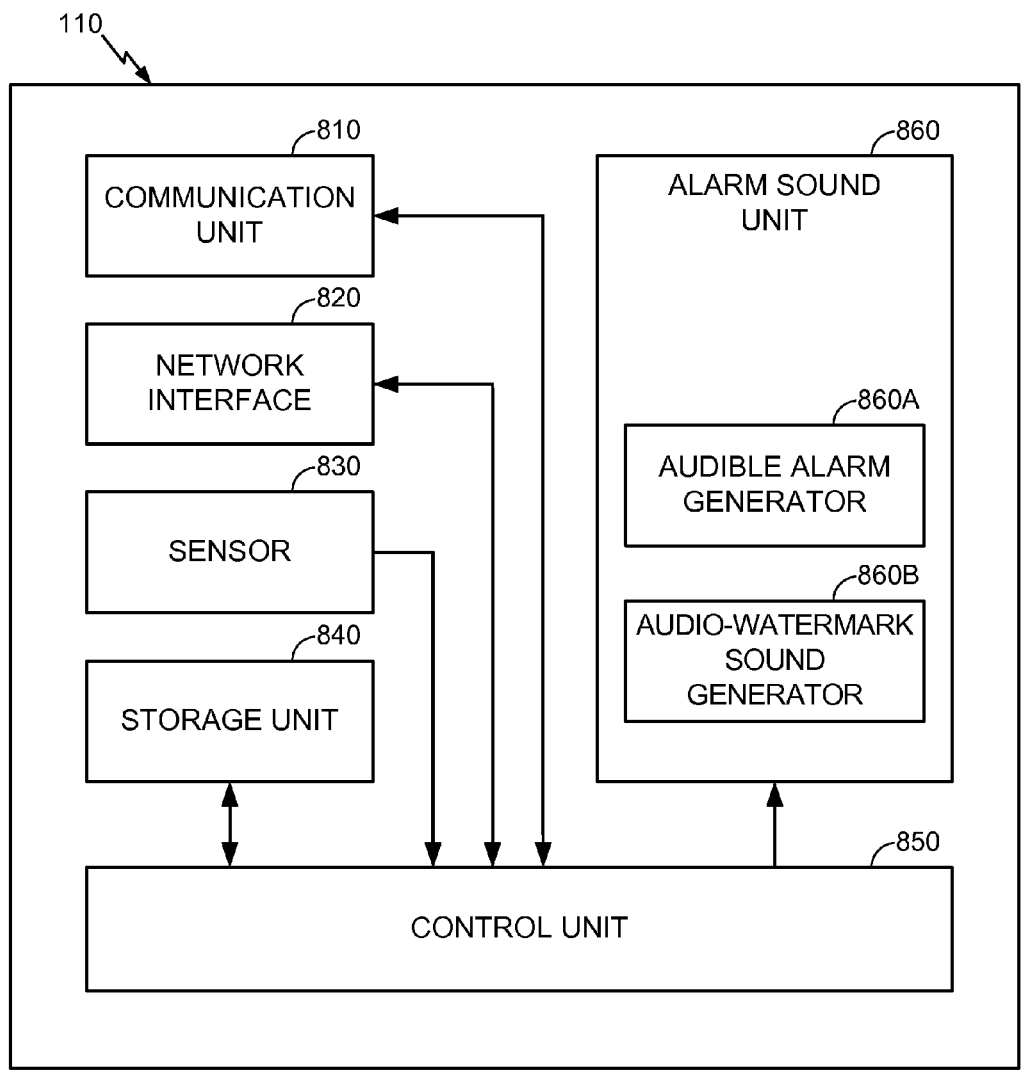
FIG. 8 illustrates a more detailed block diagram of an alarm device configured to generate and output an alarm sound including an audible alarm sound and an audio-watermark sound according to one embodiment of the present disclosure.

FIG. 8 illustrates a more detailed block diagram of the alarm device 720 in the alarm system 700 configured to generate and output an alarm sound including an audible alarm sound and an audio-watermark sound according to one embodiment of the present disclosure. The alarm device 720 may include a communication unit 810, a network interface 820, a sensor 830, a storage unit 840, a control unit 850, and an alarm sound unit 860. The alarm sound unit 860 may further include an audible alarm generator 860A and an audio-watermark sound generator 860B. It should be appreciated that the alarm device 110 described herein may also be implemented in a manner similar to the alarm device 720. Further, the control unit 850 is configured to control the overall operations of the alarm device 720.

In this embodiment, the communication unit 810 is configured to communicate with the control panel 710. For example, when any one of the alarm devices 730 to 750 detects an emergency event and transmits an alarm device ID and an emergency code for the emergency event to the control panel 710, the control panel 710 then transmits the emergency code for the emergency event to the communication unit 810 of the alarm device 720. Further, the alarm device 110 may optionally include the network interface 820 which is configured to convert the alarm sound into sound data for transmission over the network 150. Additionally or alternatively, the sound data may be transmitted to the server 140 to be used in determining the instruction for responding to the emergency event.

The sensor 830 is configured to detect an emergency event such as a fire. In this case, the sensor 830 may include a smoke detector that detects smoke as an indicator of fire. In this case, the communication unit 810 may obtain an emergency code indicating the fire and the alarm device ID from the storage unit 840, which is configured to store the alarm device ID of the alarm device 720 and a list of emergency code indicating a various types of emergency. The communication unit 810 transmits the alarm device ID and the emergency code for the fire to the control panel 710 which is configured to transmit the emergency code for the fire to the alarm devices 730 to 750 in an alarm system 700.

The alarm sound unit 860 is configured to generate and output an alarm sound including an audible sound and an audio-watermark sound. After receiving the emergency type (e.g., fire) from the sensor 830 or the communication unit 810, the audible alarm generator 860A generates the audible sound such as a siren, bell, or other audible tone, for indicating the emergency event. On the other hand, the audio-watermark sound generator 860B is configured to embed the emergency code for fire and the alarm device ID for the alarm device 720 into a sound (i.e., an audio signal) by using watermarking technologies such as an echo coding, a patch work, a phase coding, a spread spectrum coding, and a quantization index modulation. The alarm sound unit 860 then outputs the audible sound and the audio-watermark sound as the alarm sound.

Figure 9:
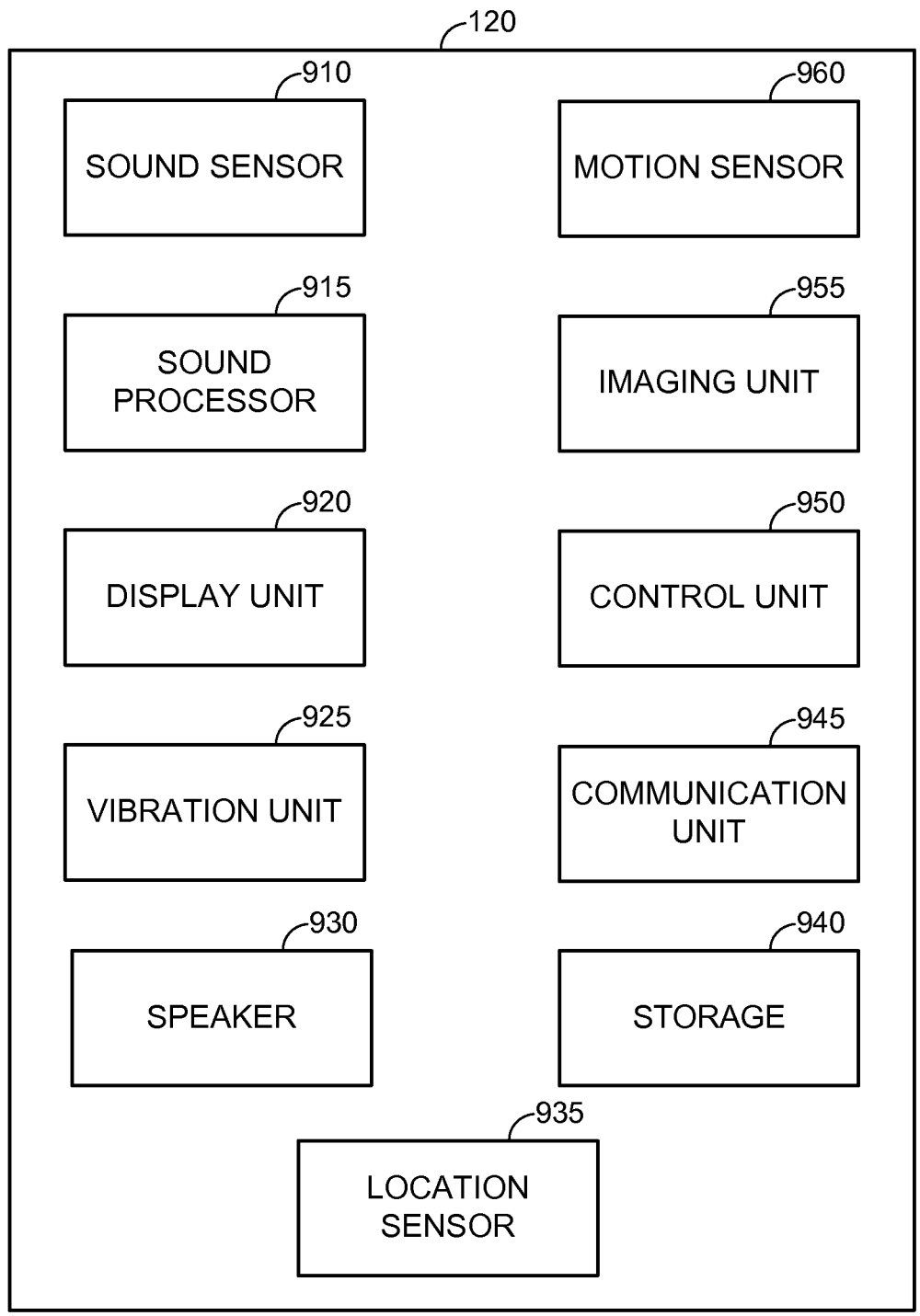
FIG. 9 illustrates a block diagram of a mobile device configured to receive an alarm sound indicating an emergency event and to output an instruction for responding to the emergency event according to one embodiment of the present disclosure.

FIG. 9 illustrates a block diagram of the mobile device 120 configured to receive an alarm sound indicating an emergency event and output an instruction for responding to the emergency event according to one embodiment of the present disclosure. In the illustrated embodiment, the mobile device 120 includes a sound sensor 910, a sound processor 915, a display unit 920, a vibration unit 925, a speaker 930, a location sensor 935, a storage unit 940, a communication unit 945, a control unit 950, an imaging unit 955, and a motion sensor 960. The control unit 950 is configured to control the overall operations of the mobile device 120.

The sound sensor 910 is configured to receive an alarm sound including an audible sound and an audio-watermark sound indicating an emergency event. The sound sensor 910 may include one or more microphones to capture and transmit input sounds to the sound processor 915. In some embodiments, the sound sensor 910 is further configured to receive surrounding sounds. For example, when the sound sensor 910 receives a loud noise or a scream as surrounding sounds, the control unit 950 may increase the volume of the speaker 930 when outputting a notification and/or an instruction for responding to the emergency event. Additionally or alternatively, the received sounds may be transmitted to the server 140 to be used in determining the instruction for responding to the emergency event.

The sound processor 915 is configured to extract the audio-watermark sound from the alarm sound, and identify an emergency code for the emergency event and an alarm device ID for an alarm device from the audio-watermark sound. The sound processor 915 may include a digital signal processor (DSP) and an application processor (AP). The DSP and AP may be used to decode the audio-watermark sound to obtain the emergency code and the alarm device ID included in the audio-watermark sound.

In some embodiments, the sound processor 915 may implement a duty cycling mode to conserve power for the mobile device 120. For example, the sound processor 915 may include an audio codec unit for performing the duty cycling mode. For the duty cycling mode, the audio codec unit is configured to operate at a predetermined percentage of time by repeating a periodical "suspend and wake-up" action. For example, the audio codec may operate for 10 ms in a period of 100 ms for a 10 percent duty cycle. In this mode, when the sound processor 915 receives the audio-watermark sound, the DSP and/or AP are turned on to decode the emergency code and the alarm device ID from the audio-watermark sound. In another embodiment, one of the DSP or AP may be turned on first, and the other processor may be turned on next. The decoded emergency code and the alarm device ID are provided to the communication unit for transmission to a server or another mobile device.

Once the emergency code and the alarm device ID have been decoded, the display unit 920 is configured to display a notification to alert the user of the mobile device 120 of the emergency event. In addition, the display unit 920 may also display an instruction for responding to the emergency event. As a part of the instruction, a map of a building with an evacuation route may be received and displayed.

The vibration unit 925 is configured to alert the user of the mobile device 120 of the emergency event through vibration. The speaker 930 may output a notification sound such as a horn and a bell sound to alert the user of the mobile device 120 of the emergency event. Further, the speaker 930 may output voice-instructions for responding to the emergency event. For example, for sight-impaired individuals, the control unit 950 may convert a text notification indicating the type of the emergency event and/or the instruction for responding to the emergency event into speech. The speaker 930 may then output the speech. The location sensor 935 is configured to track the location of the mobile device 120 by using any suitable location tracking applications including the Global Position System (GPS), a Wi-Fi or cell information, in which the mobile device is located. The storage unit 940 is configured to store data and instructions for processing the information and communicating with other devices. The mobile device 120 may obtain context data of its environment by capturing an image or sound, and/or detecting environmental parameters such as temperature. In this case, the context data is stored in the storage unit 940 and transmitted to the server 140. The communication unit 945 is configured to communicate with external devices such as a remote server and other mobile devices using a wired or wireless technology including the Wi-Fi, Cellular Data service, and Mobile Satellite communication or P2P communications (e.g., Bluetooth, LTE-direct, and Wi-Fi direct).

The imaging unit 955 is configured to capture surrounding images, and may include any device suitable for capturing an image such as a camera and a video camera. The imaging unit 955 may capture one or more images of its surrounding environment once the mobile device 120 receives the alarm sound. In one embodiment, if the brightness or the clarity of the images captured by the imaging unit 955 is determined to be affected due to smoke, the control unit 950 may adjust the brightness of the display unit 920 when outputting a notification and/or instruction for responding to the emergency event. Additionally or alternatively, the captured images may be transmitted to the server 140 to be used in determining the instruction for responding to the emergency event. In this case, the server 140 may compare the captured images with context data stored in a context database of the server 140.

The motion sensor 960 is configured to detect the movement of the mobile device 120, and may include any device suitable for detecting the movement of the mobile device 120, such as an accelerometer. In one embodiment, the motion sensor 960 may determine whether the mobile device 120 is moved since the mobile device 120 first outputs a notification and/or instruction for responding to the emergency event. In this case, if no movement of the mobile device 120 is detected, the control unit 950 may function to continuously output such a notification and/or instruction to alert the user of the mobile device 120 of the emergency event. Further, the motion sensor 960 may be configured to continuously monitor the movement of the mobile device 120 and transmit the movement information of the mobile device 120 to the server 140.

Figure 10:
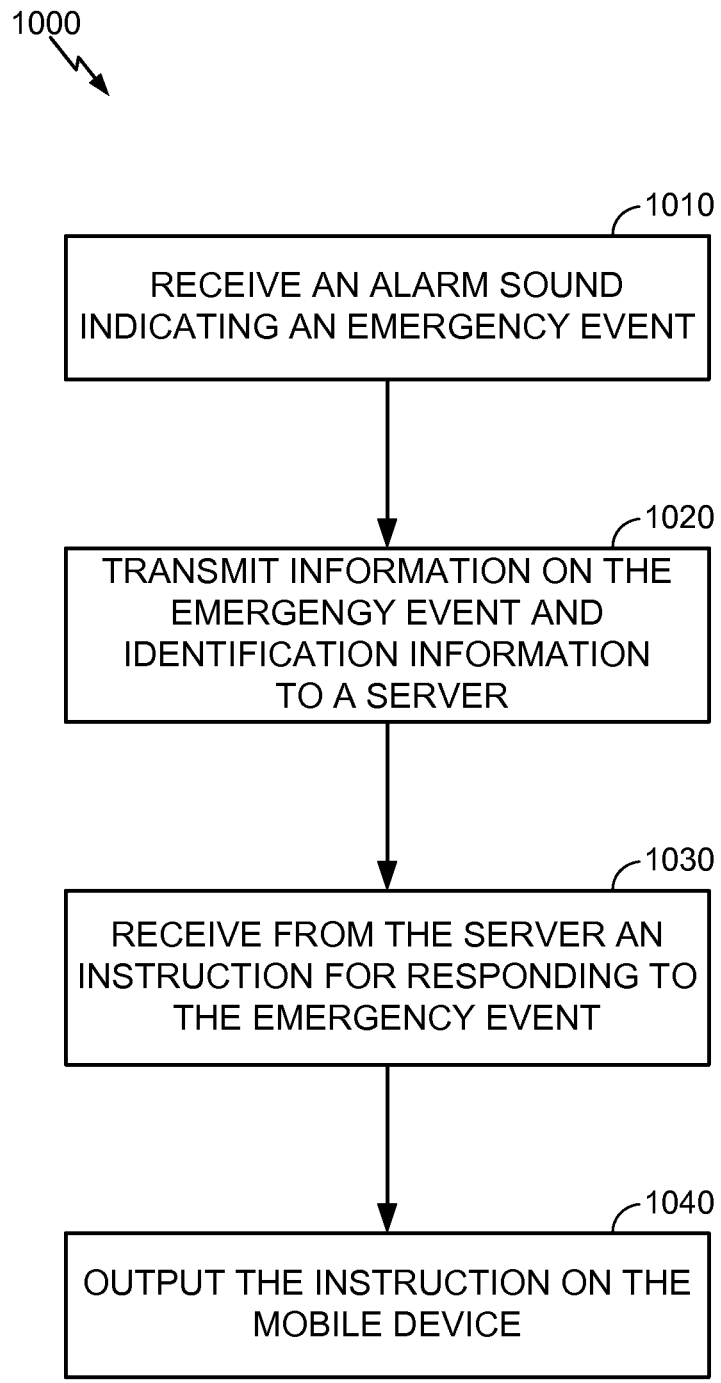
FIG. 10 is a flow chart illustrating a method, performed by a mobile device, for outputting an instruction received from a server for responding to an emergency event based on an alarm sound from an alarm device according to one embodiment of the present disclosure.

FIG. 10 is a flow chart illustrating a method 1000, performed by the mobile device 120, for outputting an instruction from the server 140 for responding to an emergency event based on an alarm sound from the alarm device 110 according to one embodiment of the present disclosure. Initially, the mobile device 120 receives an alarm sound indicating an emergency event, at 1010. The alarm sound includes an audible sound and an audio-watermark sound with information on the emergency event such as an alarm device ID and an emergency code. The mobile device 120 may be in a sleep mode in which the mobile device 120 is in a reduced power consumption state by suspending functions other than those necessary for receiving an input sound. When the received input sound is determined to be an alarm sound with an audio-watermark, the mobile device 120 wakes up from the sleep mode to obtain the alarm device ID and the emergency code from the audio-watermark sound. At this time, the mobile device 120 may output a notification to alert the user of the emergency event.

The mobile device 120 transmits the information on the emergency event and its identification information to the server 140, at 1020. The identification information of the mobile device 120 may include its location, identification number, and call back number. Based on the information received from the mobile device 120, the server 140 determines an instruction for responding to the emergency event for the mobile device 120, and transmits the instruction to the mobile device 120. The mobile device 120 receives the instruction for responding to the emergency event from the server 140, at 1030. The instruction may be a text or voice instruction, a map, or an interactive map illustrating a direction for safe evacuation. The mobile device 120 then outputs the instruction for the user of the mobile device 120, at 1040, on an output device such as a display and/or a speaker.

Figure 11:
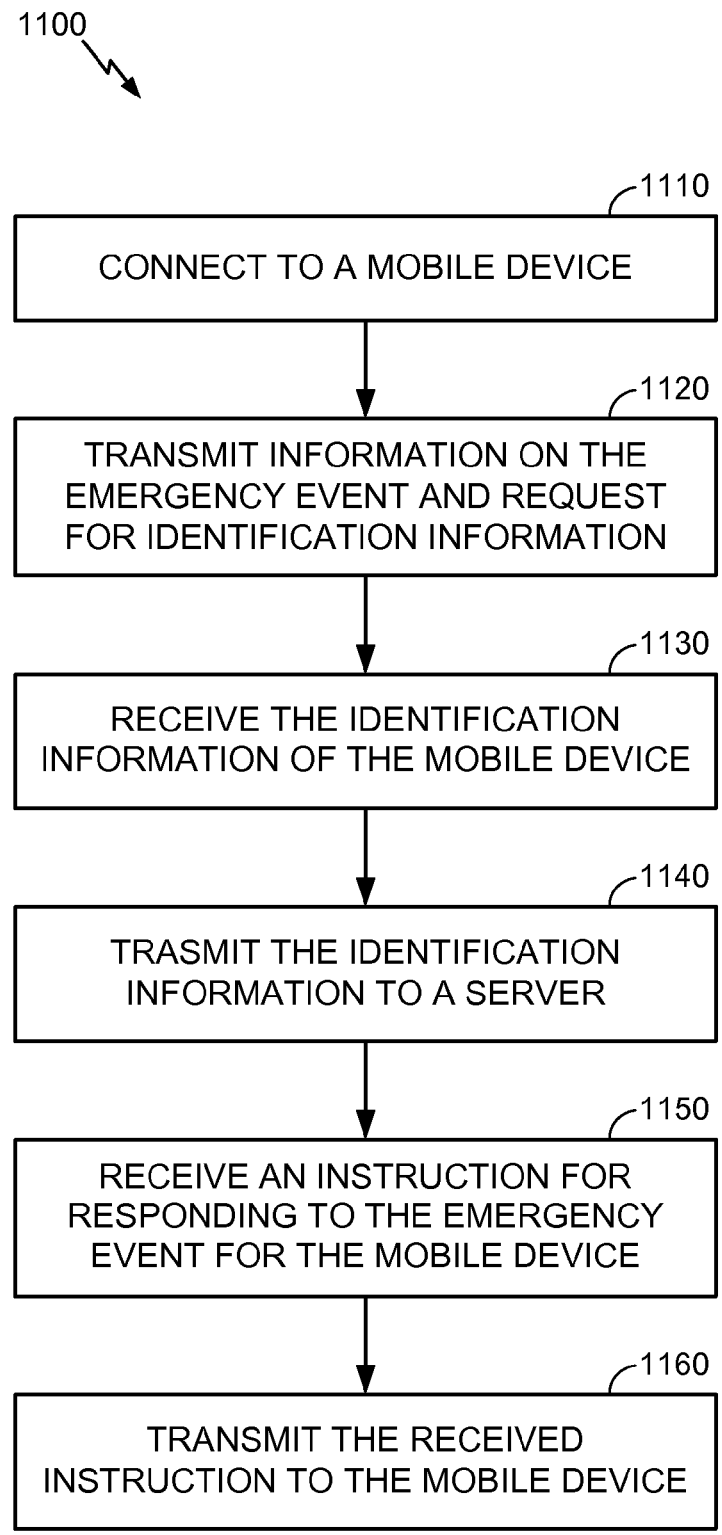
FIG. 11 is a flow chart illustrating a method, performed by a mobile device, for communicating with another mobile device to receive and output an instruction for responding to an emergency event according to one embodiment of the present disclosure.

FIG. 11 is a flow chart illustrating a method 1100, performed by the mobile device 120, for communicating with the mobile device 330 to output an instruction for responding to an emergency event for the mobile device 330 according to one embodiment of the present disclosure. In the method 1100, the mobile device 120 receives an alarm sound including an audible sound and an audio-watermark sound with information on the emergency event an alarm device ID and an emergency code. After receiving the information on the emergency event, the mobile device 120 requests the mobile device 330 to be connected with the mobile device 330 via a P2P network. Once the mobile device 120 is connected to the mobile device 330, at 1110, the mobile device 120 transmits the information on the emergency event and requests the mobile device 330 for its identification information, at 1120. The identification information of the mobile device 330 includes its location, an identification number and a call back number. Through the P2P connection, the mobile device 330 transmits the requested information of the mobile device 330 to the mobile device 120.

Then, the mobile device 120 receives the identification information of the mobile device 330, at 1130. The mobile device 120 may then transmit identification information of the mobile device 330 to the server 140, at 1140. In this case, the information on the emergency event was previously transmitted to the server 140 from the mobile device 120. Based on the information on the emergency event from the mobile device 120 and the identification information of the mobile device 330, the server 140 determines and transmits an instruction for responding to the emergency event for the user of the mobile device 330. In response, the mobile device 120 receives the instruction for responding to the emergency event for the mobile device 330 from the server 140, at 1150. The instruction may be a map or an interactive map with an evacuation route. The mobile device 120 then transmits to the mobile device 330 the instruction for the mobile device 330, at 1160. Alternatively, the mobile device 120 acting as a server may generate the instruction for the mobile device 330.

Figure 12:
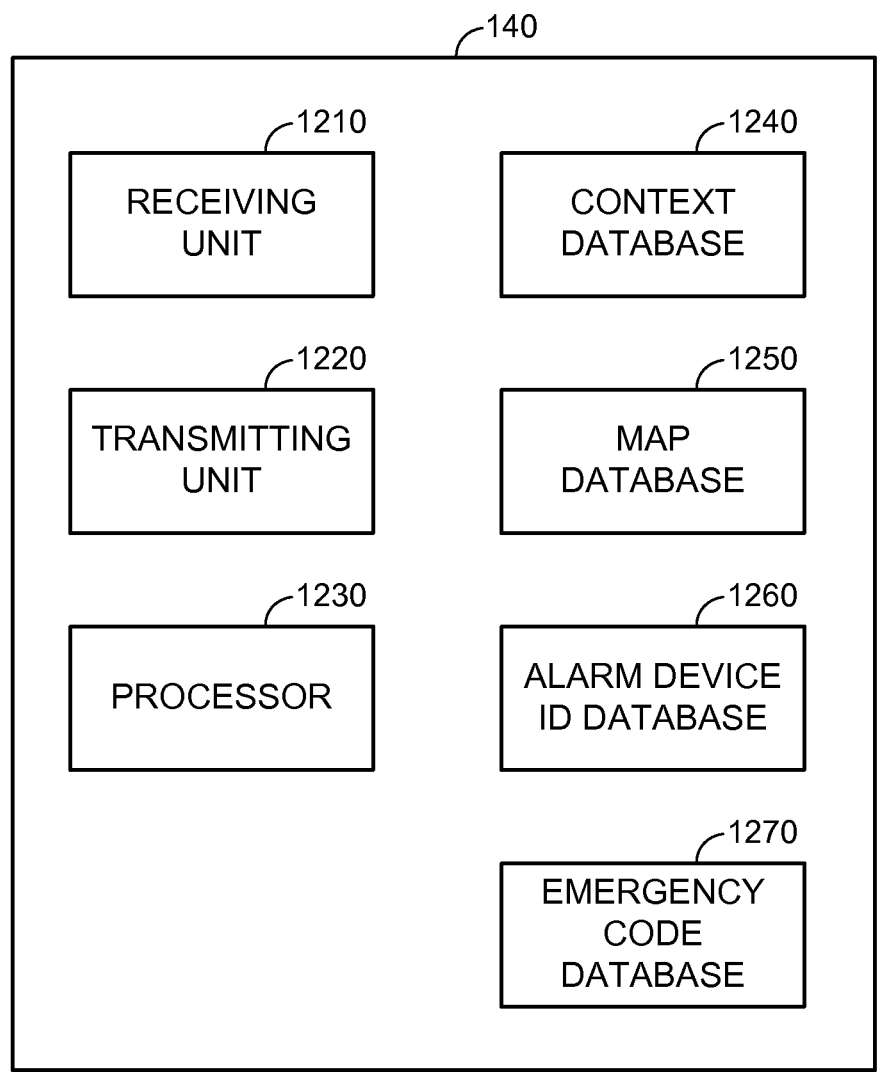
FIG. 12 illustrates a block diagram of a server configured to receive information indicating an emergency event and output to a mobile device an instruction for responding to the emergency event according to one embodiment of the present disclosure.

FIG. 12 illustrates a block diagram of the server 140 configured to receive information on an emergency event and generate an instruction for responding to the emergency event for a mobile device according to one embodiment of the present disclosure. In the illustrated embodiment, the server 140 includes a receiving unit 1210, a transmitting unit 1220, a processor 1230, and a plurality of databases 1240 to 1270. The server 140 may be implemented using any suitable computer system equipped to communicate with other external devices through as network.

The receiving unit 1210 is configured to receive from mobile devices information on an emergency event and identification information of the mobile devices. As discussed above, the server 140 may receive from the mobile device 120 information on an emergency event and its identification information through the receiving unit 1210. The identification information includes a location, an identification number and a call back number of the mobile device 120. Alternatively, instead of receiving the information on the emergency, the server 140 may receive an alarm sound including the information on the emergency from the mobile device 120. In this case, the server 140 may further include a sound processor similar to the sound processor 915 to process the received alarm sound and obtain the information on the emergency event.

The plurality of databases includes a context database 1240, a map database 1250, an alarm device ID database 1260, and an emergency code database 1270. The context database 1240 is configured to store reference context data for use in determining an instruction for responding to the emergency event for the mobile device 120. That is, the processor 1230 may receive the context data from the mobile device 120 and compare the context data with the reference context data for assessing the emergency event. In one embodiment, when the mobile device 120 transmits a captured image of its surrounding environment to the server 140, the server 140 may compare the received image with a stored image in the context database 1240 and determine the severity of the emergency event based on the brightness or the clarity of the captured image. In another embodiment, the mobile device 120 may transmit a captured sound of its surrounding environment to the server 140. Then, the server 140 may compare the received sound with reference sound data stored in the context database 1240 and, for example, if the received sound includes a scream or the like, which is indicative of the emergency event, determine the severity of the emergency situation.

The map database 1250 is configured to store a plurality of maps for providing an instruction for responding to an emergency event. The map database 1250 may include floor plans of buildings and street maps of a geographic region in which the mobile device 120 is located. Accordingly, when server 140 receives from the mobile device 120 information on the emergency event and its location included in the identification information, it may access the map database 1250 to obtain a floor plan of a building corresponding to the location of the mobile device 120. Using the floor plan, the processor 1230 may generate an instruction including a map indicating an evacuation route out of the building.

The alarm device ID database 1260 is configured to store a location of each of the alarm devices. For example, when an alarm device ID is received from the mobile device 120, the processor 1230 may access the alarm device ID database to determine the location of the alarm device. In addition, the emergency code database 1270 is configured to store the types of the emergency associated with emergency codes. For example, when the server 140 receives an emergency code indicating a fire, the processor accesses the emergency code database 1270 to identify the emergency event as a fire.

Based on the databases 1240 to 1270 and information received from the mobile device 120, the processor 1230 generates for the mobile device 120 an instruction for responding to the emergency event. The processor 1230 provides the instruction for the mobile device 120 to the transmitting unit 1220, which transmits the instruction to the mobile device 120.

In one embodiment, the server 140 may communicate with mobile devices which are not equipped to receive and/or process an alarm sound. In this case, the server 140 may send a request, through the transmitting unit 1220 and the network 150, to a base station or an access point for obtain a list of mobile devices within the vicinity of the base station or the access point. After receiving the list of the mobile devices through the network 150 and the receiving unit 1210, the server 140 transmits the information on the emergency event and/or an instruction for responding to the emergency event for each of the mobile devices in the list.

Figure 13:
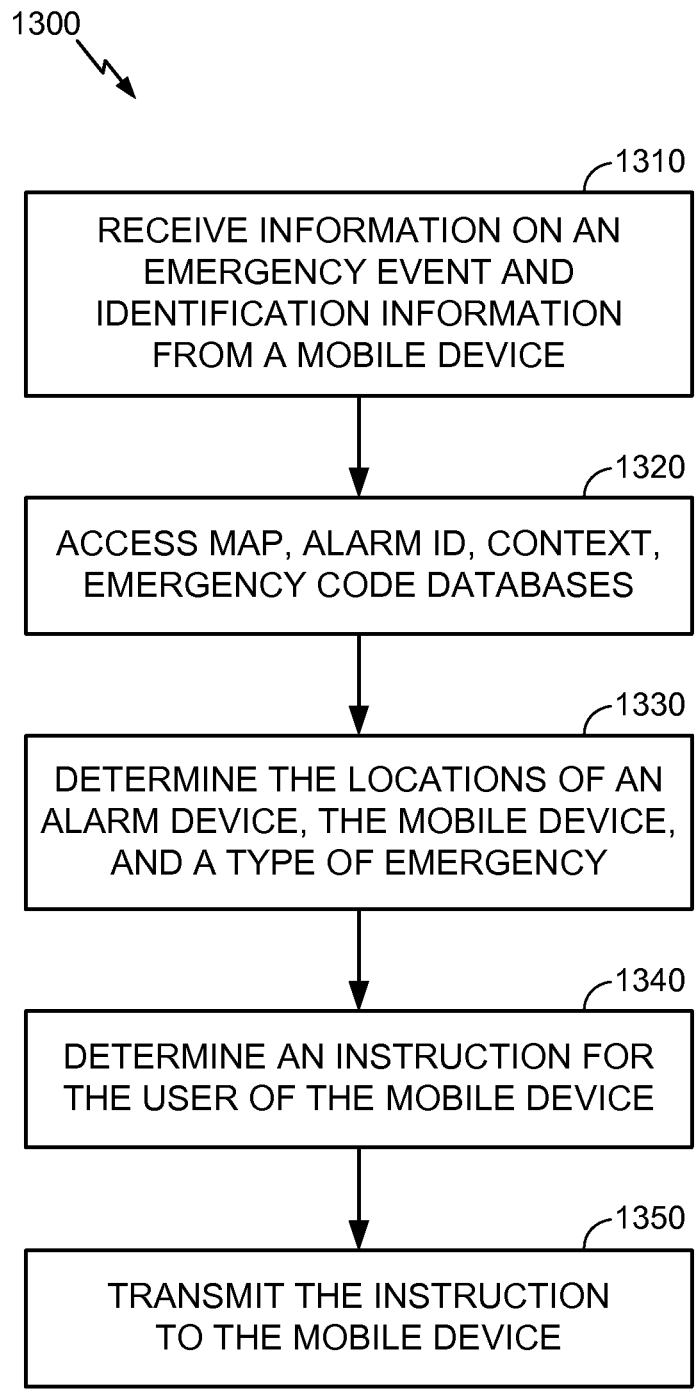
FIG. 13 is a flow chart illustrating a method, performed by a server, for outputting to a mobile device an instruction for responding to an emergency event according to one embodiment of the present disclosure.

FIG. 13 is a flow chart illustrating a method 1300, performed by the server 140, for outputting to the mobile device 130 an instruction for responding to an emergency event according to one embodiment of the present disclosure. In the method 1300, the server 140 receives, from the mobile device 120, information on the emergency event and its identification information, at 1310. The information on the emergency includes an alarm device ID and an emergency code for the emergency event, and the identification information of the mobile device 120 includes its location, identification number and callback number.

Based on the received information from the mobile device 120, the server 140 accesses a map, an alarm device ID, a context, and an emergency code databases, at 1320. Then, server 140 determines a location of an alarm device associated with the alarm device ID, and the location of the mobile device 120, and the type of the emergency event, at 1330. For example, the server 140 accesses the alarm device ID database for determining the location of the alarm device associated with the received alarm device ID. For determining the type of emergency event, the server 140 accesses the emergency code database to find a match for the emergency code from the mobile device 120. Further, the map database is accessed to obtain a floor plan or a street map corresponding to the location of the mobile device 120. Based on the above determined locations and the type of the emergency event, the server 140 generates an instruction including a map for the user of the mobile device 120, at 1340. The instruction for the mobile device 120 is then transmitted to the mobile device 120, at 1350.

Figure 14:
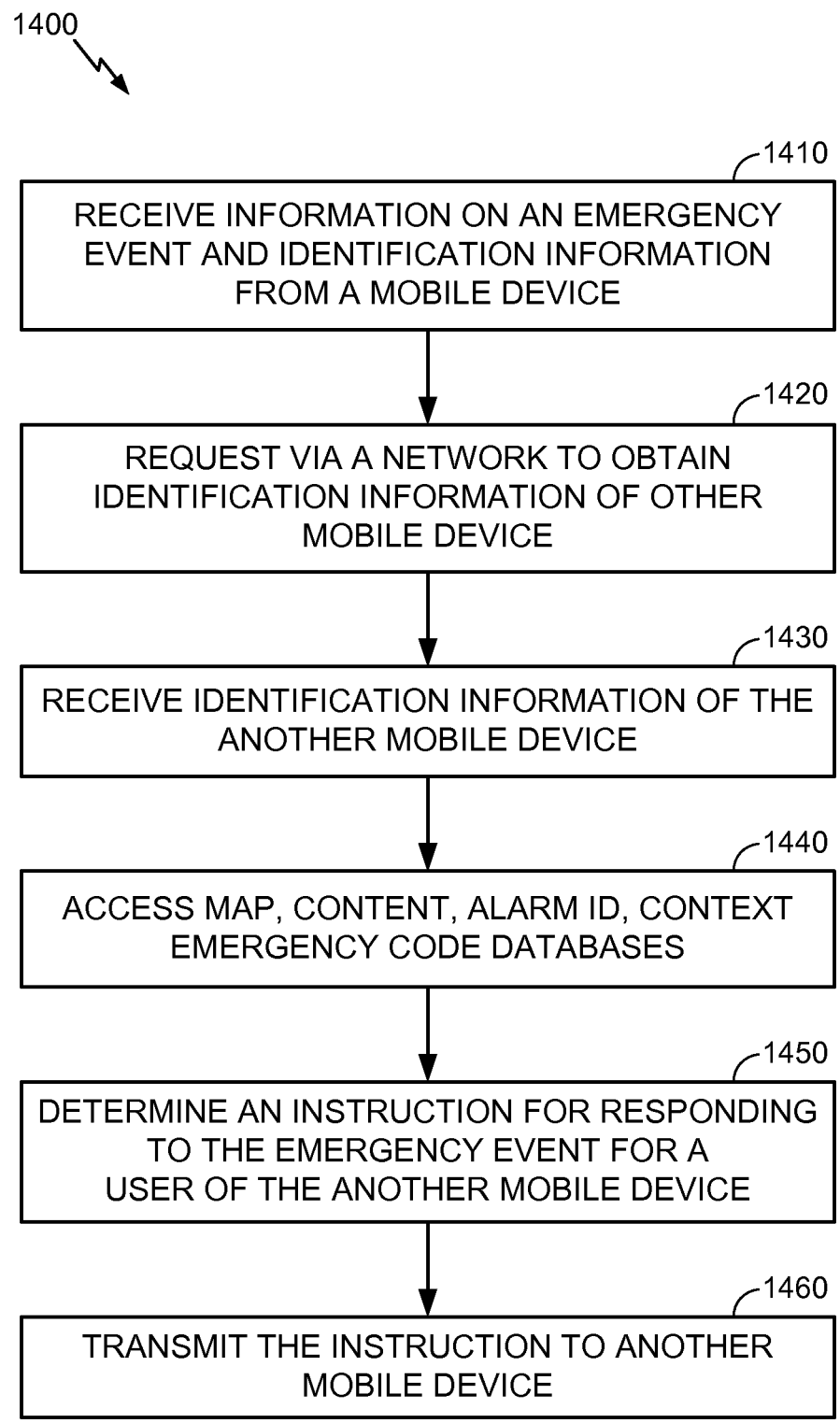
FIG. 14 is a flow chart illustrating a method, performed by a server, for providing a safety instruction to a mobile device in response to information indicating an emergency event received from another mobile device according to one embodiment of the present disclosure.

FIG. 14 is a flow chart illustrating a method 1400, performed by the server 140, for providing a safety instruction to the mobile device 230 in response to information indicating an emergency event received from the mobile device 120 according to one embodiment of the present disclosure. In the method 1400, the server 140 receives from the mobile device 120 its identification information and information on the emergency event, at 1410. The information on the emergency includes an alarm device ID and an emergency code for the emergency event, and the identification information of the mobile device 120 includes a location, an identification number and a callback number of the mobile device 120.

Based on the received information from the mobile device 120, the server 140 sends a request though the network 150 for a base station or an access point to obtain identification information of other mobile devices within the coverage area of the base station or the access point, at 1420. The base station or the access point may determine that the mobile device 230 is within the coverage area, and transmits to the server 140 the identification number of the mobile device 230. The server 140 receives the identification information of the mobile device 230, which is in vicinity of the mobile device 120, at 1430. Then, the server 140 accesses a map, an alarm device ID, a context, and an emergency code databases, at 1440, and determines a location of an alarm device associated with the alarm device ID, the location of the mobile device 230 and a type of the emergency event. Based on the determined locations and the type of the emergency event, the server 140 determines an instruction for responding to the emergency event for the user of the mobile device 230, at 1450. The instruction for the mobile device 230 is then transmitted to the mobile device 230, at 1460.

Figure 15A:
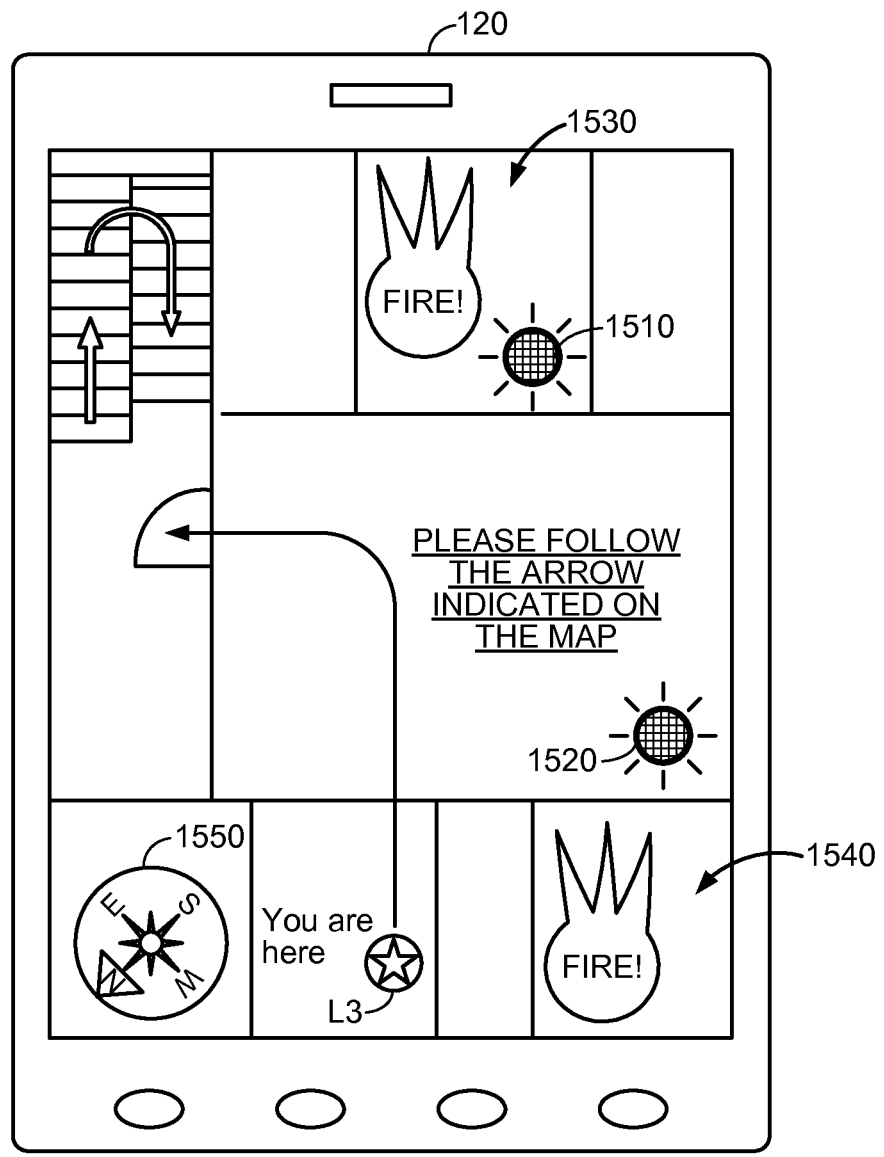
FIG. 15A illustrates a mobile device displaying an instruction for responding to an emergency event using an augmented reality technology according to another embodiment of the present disclosure.

FIG. 15A illustrates the mobile device 120 displaying an instruction for responding to an emergency event using a map according to one embodiment of the present disclosure. In response to an emergency event, the alarm devices 1510 and 1520 are configured to generate an alarm sound including an audible sound and an audio-watermark sound, which includes information on the emergency event such as an alarm device ID and an emergency code. In the illustrated embodiment, the alarm device 1510 detects a fire in a room 1530 and the alarm device 1520 detects a fire in a room 1540. In response to the detected fire, each the alarm devices 1510 and 1520 generate an alarm sound with an audible sound and an audio-watermark sound, which includes an emergency code, for example, "01" indicating a fire event and an alarm device ID "1510" or "1520," respectively. In another embodiment, the alarm devices 1510 and 1520 may communicate with a control panel and receive each other's alarm device ID for notifying the locations of two fire events, which also will be embedded to the audio-watermark sound of each of the alarm devices 1510 and 1520.

In this case, the mobile device 120 is configured to receive the alarm sound from the alarm device 1520 due to its proximity to the mobile device 120. After receiving the alarm sound with the audio-watermark sound from the alarm device 1520, the mobile device 120 extracts the emergency code "01," and the alarm device ID "1520." The mobile device 120 then transmits the emergency code "01" indicating a fire event and the alarm device ID "1520" to the server 140. Based on the received information from the mobile device 120, the server 140 is configured to determine and transmit to the mobile device 120 an instruction for responding to the fire. In the illustrated embodiment, the instruction is a floor map including locations of two fire events and indicating an evacuation route out of the floor. In addition, the instruction may include a digital compass which may guide the user of the mobile device 120 to navigate out of the emergency event. Once the mobile device 120 receives the instruction including a map indicating the evacuation route for the mobile device 120 and a digital compass 1550 for navigation, the instruction is displayed on a display of the mobile device 120. The user of the mobile device 120 may then follow the instruction for safe evacuation.

Figure 15B:
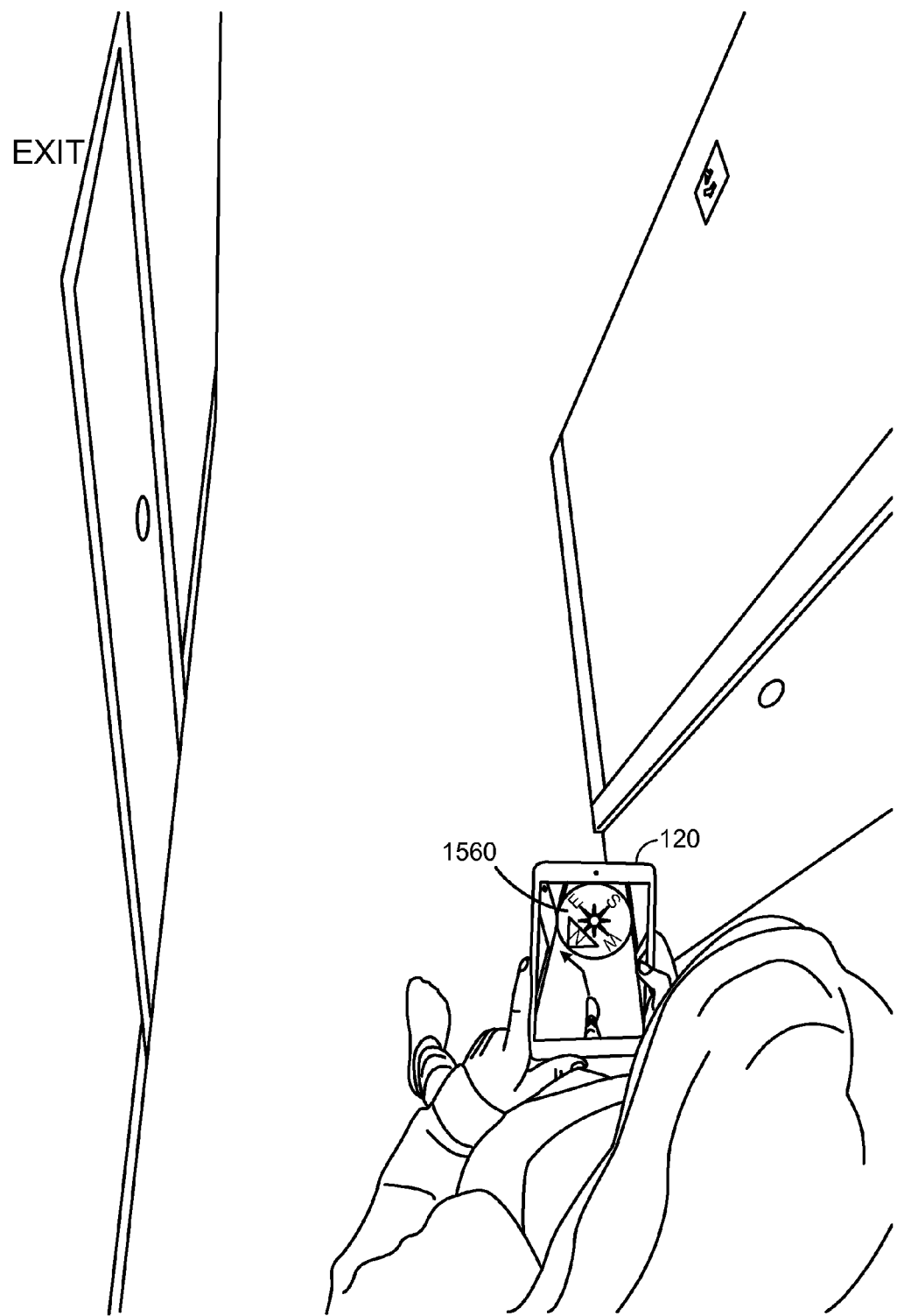
FIG. 15B illustrates a mobile device in a vehicle that is configured to receive an alarm sound from an emergency vehicle according to one embodiment of the present disclosure.

FIG. 15B illustrates the mobile device 120 displaying an instruction for responding to an emergency event using an augmented reality (AR) technology according to another embodiment of the present disclosure. In this case, the mobile device 120 may include an AR application which is executed to provide a user with an AR image that is a composite image combining a real-world image captured by a camera of the mobile device 120 in real-time and a computer-generated image to augment the real-world image. In the illustrated embodiment, similar to FIG. 15A, the mobile device 120 receives from the server 140 an instruction including information for displaying an evacuation route using the AR application, which is determined by the server 140 based on the information on the emergency event and the identification information of the mobile device 120. In addition, the instruction may include a digital compass 1560 which may be used to navigate out of the emergency event.

In response to receiving the information for displaying the evacuation route using the AR application, the mobile device 120 initiates the AR application to output on its display an AR image including the real world image captured by the camera in real-time and an evacuation route superimposed on the real world image. For example, the evacuation route may include a text indicating a distance from the current location of the mobile device 120 to a next destination and an arrow indicating a direction to the next destination. Further, the AR image is configured to change according to the user's movement to the destination. In the illustrated embodiment, an arrow is displayed in the AR image to direct the user of the mobile device 120 to safe evacuation.

Figure 16A:
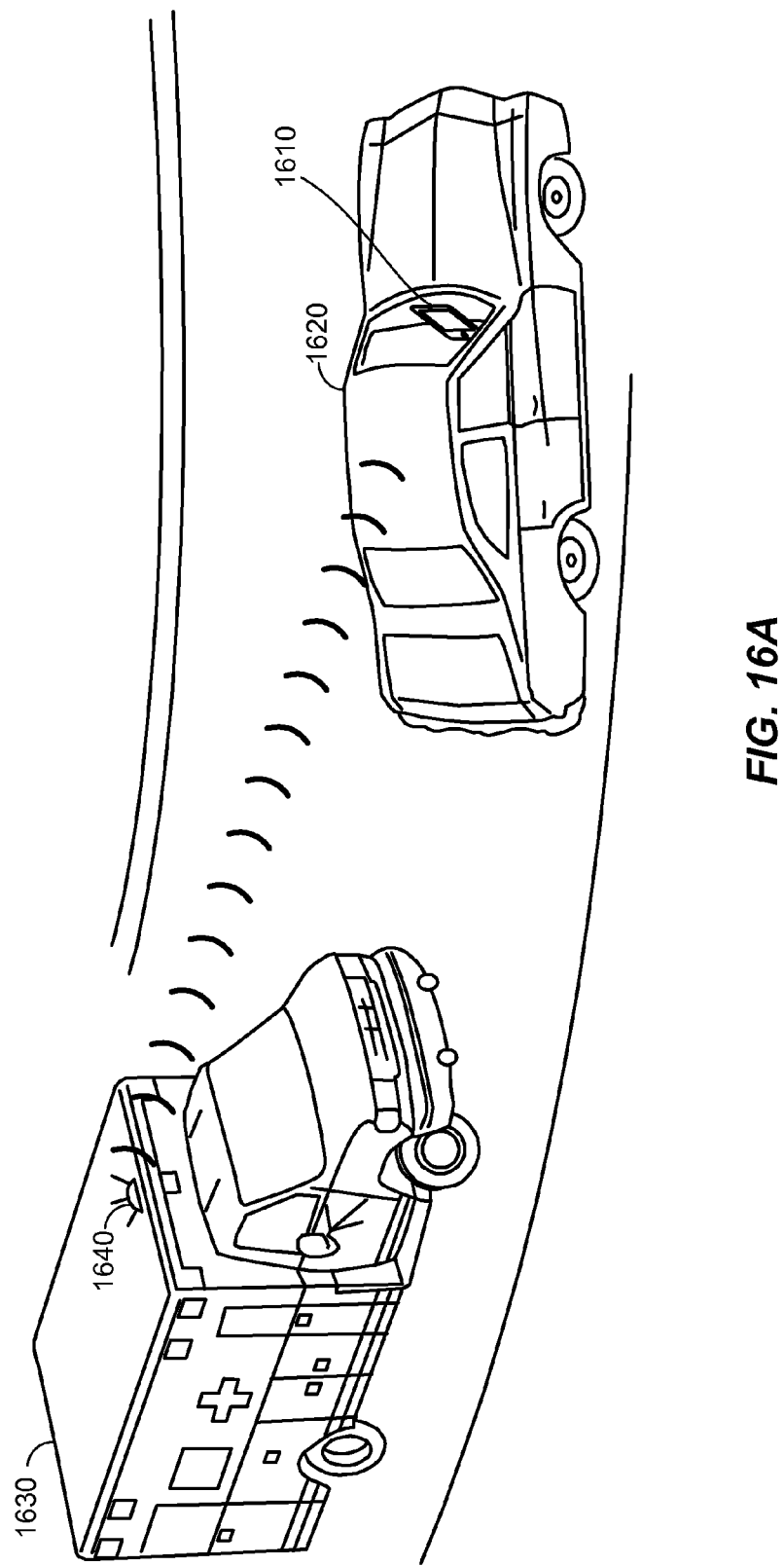
FIG. 16A illustrates the mobile device in the vehicle displaying an instruction for responding to the alarm sound according to one embodiment of the present disclosure.

FIG. 16A illustrates a mobile device 1610 in a vehicle 1620 that is configured to receive an alarm sound from an emergency vehicle 1630 according to one embodiment of the present disclosure. In this illustrated embodiment, an alarm device 1640 is configured to generate an alarm sound including an audible sound and an audio-watermark sound for the emergency vehicle 1630. The emergency vehicle 1630 may include a fire truck, an ambulance, a school bus, and any other vehicle in emergency. The audible sound may include a siren, a bell, and any other type of audible warning sounds, and the audio-watermark sound may include information such as the location, a destination, and a driving route of the emergency vehicle 1630, and an emergency code identifying the type of the emergency vehicle 1630.

When in emergency, the time is of essence and thus, it is imperative that other vehicles in the driving route of the moving emergency vehicle 1630 yield right of way to the emergency vehicle 1630. As such, the moving emergency vehicle 1630 generates and outputs an alarm sound including the audio-watermark sound via the alarm device 1640. For example, for an ambulance, the alarm device 1640 may generate an alarm sound with an audio-watermark sound including its alarm ID and an emergency code for the ambulance. In some embodiments, the audio-watermark sound may include a location, a destination, and a driving route of the emergency vehicle 1630. The mobile device 1610 located within the communication range of the alarm device 1640, is configured to receive the alarm sound.

Figure 16B:
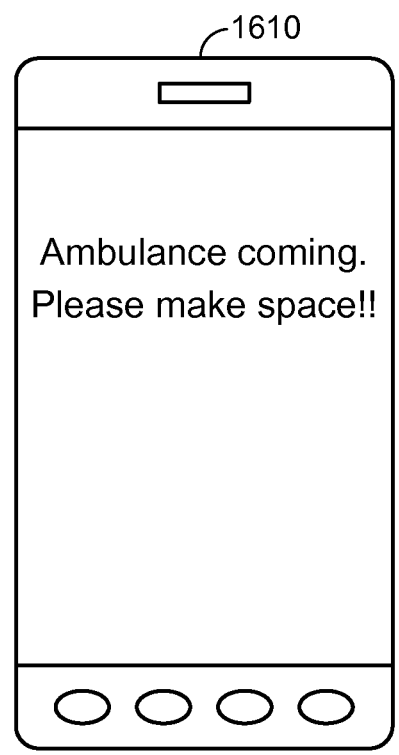
FIG. 16B illustrates a mobile device displaying an instruction for responding to an approaching emergency vehicle according to an embodiment of the present disclosure.

Once the alarm sound including the audio-watermark sound is received, the mobile device 1610 extracts an emergency code for the ambulance. A notification of the approaching emergency vehicle 1630 may be output on the mobile device 1610. In this case, the notification may be in the form of a vibration, a sound, and/or a display to alert the user of the mobile device 1610 of the approaching emergency vehicle 1630. For example, FIG. 16B illustrates that the mobile device 1610 in the vehicle 1620 may display an instruction for responding to the approaching emergency vehicle 1630 on the display on the mobile device 1610 according to one embodiment of the present disclosure. The user of the mobile device 1610 then may act accordingly to yield right of way to the approaching emergency vehicle 1630.

In another embodiment, the mobile device 1610 may transmit the received alarm ID and the emergency code to a server. Based on the received alarm ID and the emergency code, the server may determine an instruction including a map indicating the current location of the mobile device 1610, and the location, the destination, and the driving route of the emergency vehicle 1630. The instruction is then transmitted to the mobile device 1610 and may be output on the display of the mobile device 1610.

In some other embodiment, the emergency vehicle 1630 may communicate with a base station and/or an access point, which is near the location of the emergency vehicle 1630. The emergency vehicle 1630 then transmits the emergency code and the location for the ambulance to the base station and/or an access point. In this case, the base station and/or a Wi-Fi access point may broadcast the emergency code and the location for the ambulance to other mobile devices within the coverage area of the base station and/or an access point. The users of the other mobile device then may act accordingly to yield right of way to the approaching emergency vehicle 1630.

In some embodiments, a moving mobile device may receive the emergency code and the location for the ambulance from the mobile device 1610 in a peer-to-peer relationship. The moving mobile device is not configured to receive and/or process the alarm sound with an audio-watermark sound. Instead, the moving mobile device, which is in the communication range of the mobile device 1610, is configured to communicate with the mobile device 1610 in a P2P network for receiving the emergency code and the location for the ambulance.

Figure 17:
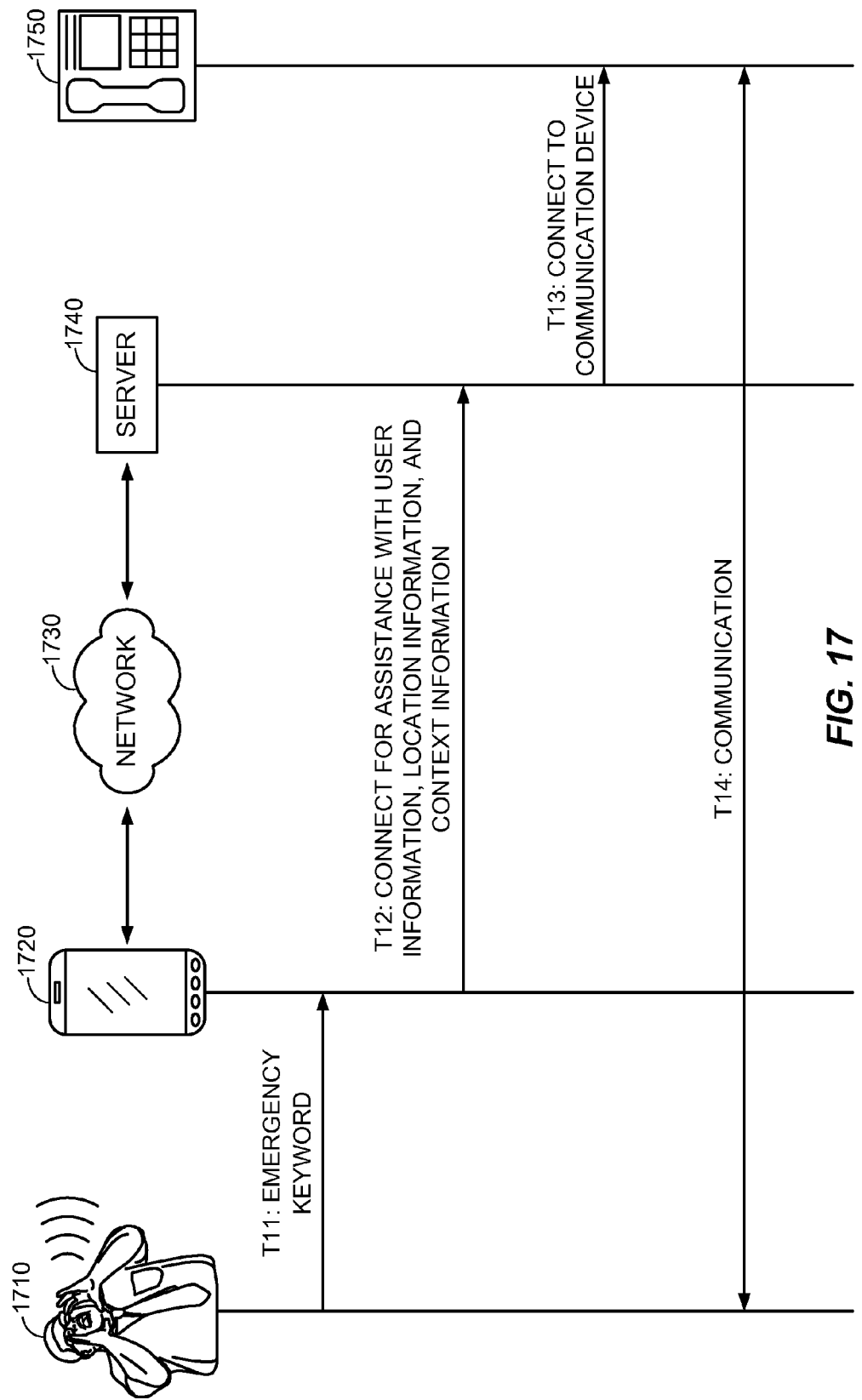
FIG. 17 illustrates a communication system in which a mobile device is configured to connect to an emergency server for assistance in response to an emergency keyword from a user.

FIG. 17 illustrates a method performed in a communication system including a mobile device 1720 and an emergency server 1740. The emergency server 1740 may communicate through a network 1730 to provide assistance in response to receiving an emergency keyword from a user 1710, in one embodiment of the present disclosure. Initially, the mobile device 1720 is configured to store a predetermined emergency keyword that indicates a request for assistance in an emergency event. For example, the emergency keyword may be one or more words such as "HELP," "FIRE," "ACCIDENT," "EMERGENCY," "HELP ME," "SAVE ME," "CALL FOR HELP." The emergency keyword can be assigned and stored in advance by a manufacturer of the mobile device 1720 or a provider of an associated application program. In some embodiments, the user 1710 may assign and store the emergency keyword in the mobile device 1720 in advance, for example, by typing or verbally recording the emergency keyword, which is described in more detail below.

In this context, an emergency event refers to an event where the user 1710 is in need of immediate assistance or help to save or protect the user's health, life, property, and/or environment. In one embodiment, the user 1710 may not be in a condition to physically manipulate the mobile device 1720 in an emergency event. For example, when the user 1710 is injured in an accident such as a car accident, a fall while hiking, or the like, the user 1710 may be deprived of the use of his or her limbs without losing the capacity of speech. In such a case, the user 1710 may use the mobile device 1720 to request assistance.

Turning to FIG. 17, the user 1710 in an emergency event speaks a predetermined emergency keyword, for example, "HELP ME," to initiate a request for assistance, at T11. The mobile device 1720 receives the emergency keyword from the user 1710 as an input sound and is configured to determine whether or not the received input sound matches the predetermined emergency keyword stored in the mobile device 1720 based on a speech recognition application which is described in more detail below. If the input sound is determined to match the predetermined emergency keyword, the mobile device 1720 connects to the emergency server 1740 through the network 1730, at T12. The network 1730 may be any type of communication networks capable of transmitting data and/or voice calls, such as local area networks, wide area networks, wireless networks (e.g., Wi-Fi, CDMA, GSM, W-CDMA, LTE, LTE Advanced), and/or packet switching networks.

In one embodiment, the mobile device 1720 may connect to the emergency server 1740 via a data communication network and/or a voice communication network. When the mobile device 1720 connects to the emergency server 1740 via the data communication network, the mobile device 1720 may provide the emergency server 1740 with at least one of user information, location information, and context information. The user information may include any information relating to the user 1710 such as a name, a user identification, a phone number, health information (e.g., a blood type, a pre-existing medical condition, and the like), etc. The location information indicates a location of the mobile device 1720 such as an address, latitude and longitude, or the like that can be provided by a location tracking unit or application in the mobile device 1720. The context information may include information relating to the environment or surroundings of the mobile device 1720 such as a lighting condition, a sound condition, etc. The information provided by the mobile device 1720 may be used by the emergency server 1740 in determining appropriate assistance to be rendered. Further, the information may be stored in a storage unit of the emergency server 1740.

In addition to the data connection, the mobile device 1720 may also, or alternatively, connect to the emergency server 1740 through a voice call. The voice call may be a phone call or a video call and can be made through the network 1730 using any suitable communication technology such as a VoIP (Voice over IP) protocol, a VoLTE (Voice over LTE) protocol, etc. Once connected, the connection between the mobile device 1720 and the emergency server 1740 can be maintained until appropriate assistance is rendered.

After obtaining information from the mobile device 1720, the emergency server 1740 connects the mobile device 1720 to a communication device 1750 (e.g., a telephone, a mobile phone, etc.) operated by an emergency operator (e.g., a 911 operator) by forwarding the voice call, at T13. Further, the emergency server 1740 may provide the above information to the emergency operator via the communication device 1750 for use in assessing the emergency event and deciding on the appropriate assistance. When the voice call is connected with the mobile device 1720, the emergency operator communicates with the user 1710, at T14, to assess the condition of the user 1710 and the emergency event for deciding the appropriate assistance. For example, during the communication with the user 1710, the emergency operator may ask the user 1710 about details of the user's condition and/or the emergency event and decide whether and how to provide assistance to the user 1710.

Upon obtaining the above information, the emergency operator causes appropriate assistance to be rendered by, for example, notifying a rescue team, a medical team, etc. of the user 1710 and the emergency event. In one embodiment, the emergency server 1740 and the emergency operator may be included in an emergency center (e.g., a 911 center). In another embodiment, the emergency server 1740 and the emergency operator may be separate entities such as an automated server in an emergency management center and an operator in a hospital.

Figure 18:
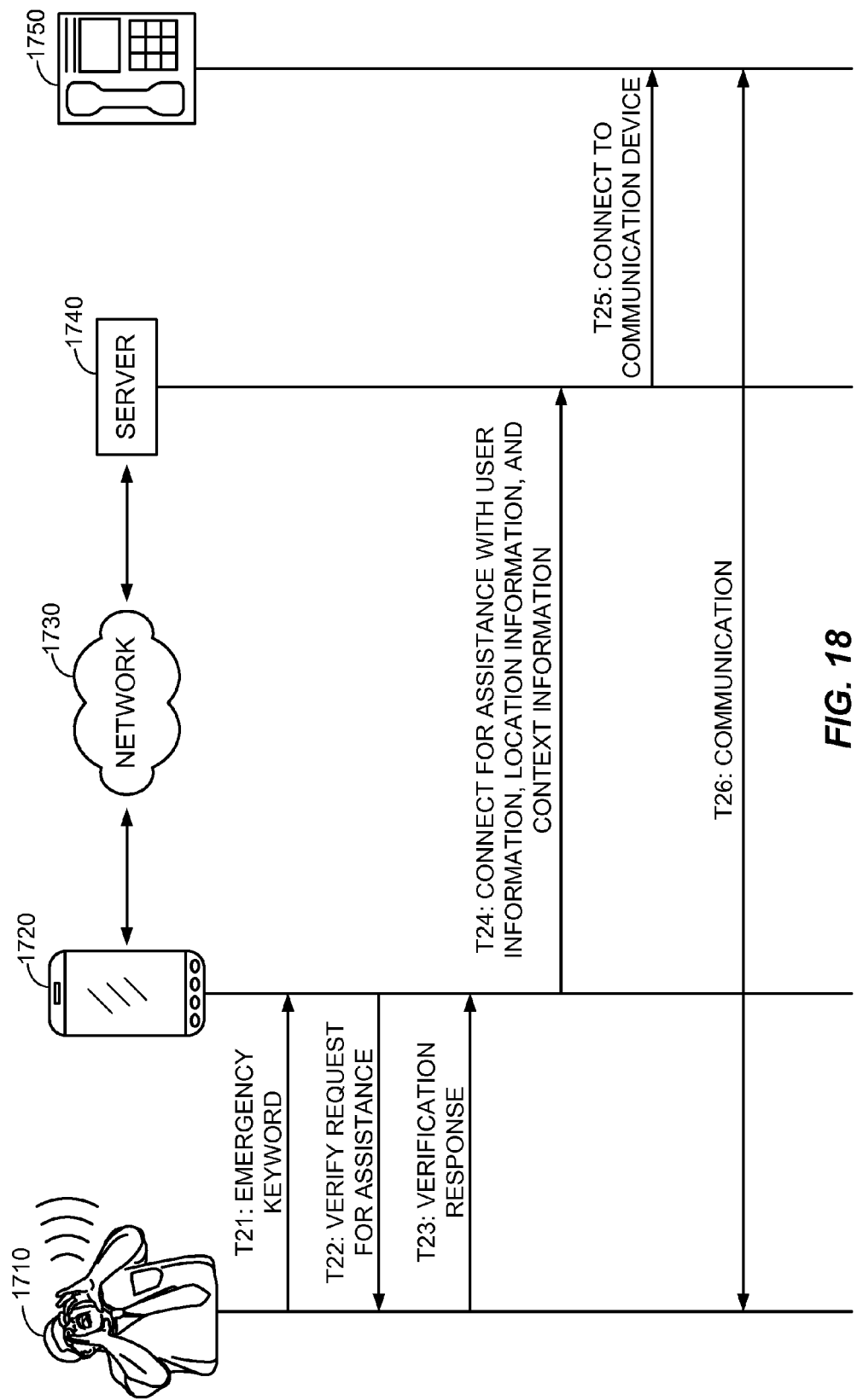
FIG. 18 illustrates a communication system in which a mobile device is configured to verify a request for assistance in response to an emergency keyword and connect to an emergency server for providing the assistance.

In some embodiments, when the user 1710 speaks a predetermined emergency keyword, the mobile device 1720 verifies whether the user 1710 seeks emergency assistance. FIG. 18 illustrates a method performed in a communication system in which the mobile device 1720 is configured to verify a request for assistance in response to receiving an emergency keyword from the user 1710. The mobile device 1720, the network 1730, and the emergency server 1740 illustrated in FIG. 18 are the same or similar units as those in FIG. 17.

At T21, the user 1710 in an emergency event speaks a predetermined emergency keyword to initiate a request for assistance. The mobile device 1720 is configured to receive the emergency keyword from the user 1710 as an input sound and to determine whether the received input sound matches the predetermined keyword. If the input sound is determined to match the predetermined emergency keyword, the mobile device 1720 outputs a query to the user 1710 to verify the user's request for assistance, at T22. For example, the mobile device 1720 may ask the user 1710 a yes-or-no question such as "DO YOU REALLY WANT TO CALL AN EMERGENCY CENTER" or "DO YOU REALLY WANT HELP." In response to the verification query, the user 1710 verifies his or her request for assistance by providing a verbal answer of "YES" or "NO" to the query, at T23. If the user's answer is "YES," the mobile device 1720 proceeds to connect to the emergency server 1740 for providing assistance as described above in FIG. 17. On the other hand, if the user's answer is "NO," the mobile device 1720 terminates communication with the user 1710 and takes no further action. In this manner, the verification prevents (or reduces) erroneous or accidental calls or connections to an emergency center or an emergency operator.

Based on the user's verification of the request for the assistance, the mobile device 1720 connects to the emergency server 1740 through the network 1730 for obtaining assistance, at T24. Over the connection via the network 1730, the mobile device 1720 provides the emergency server 1740 with at least one of user information, location information, and context information via a data communication network. In addition to the data connection, the mobile device 1720 may also connect to the emergency server 1740 through a voice call. After obtaining the above information from the mobile device 1720, the emergency server 1740 connects the mobile device 1720 to an emergency operator via the communication device 1750 by forwarding the voice call, at T25. When the voice call is connected with the mobile device 1720, the emergency operator communicates with the user 1710, at T26, to assess the condition of the user 1710 and the emergency event.

Figure 19:
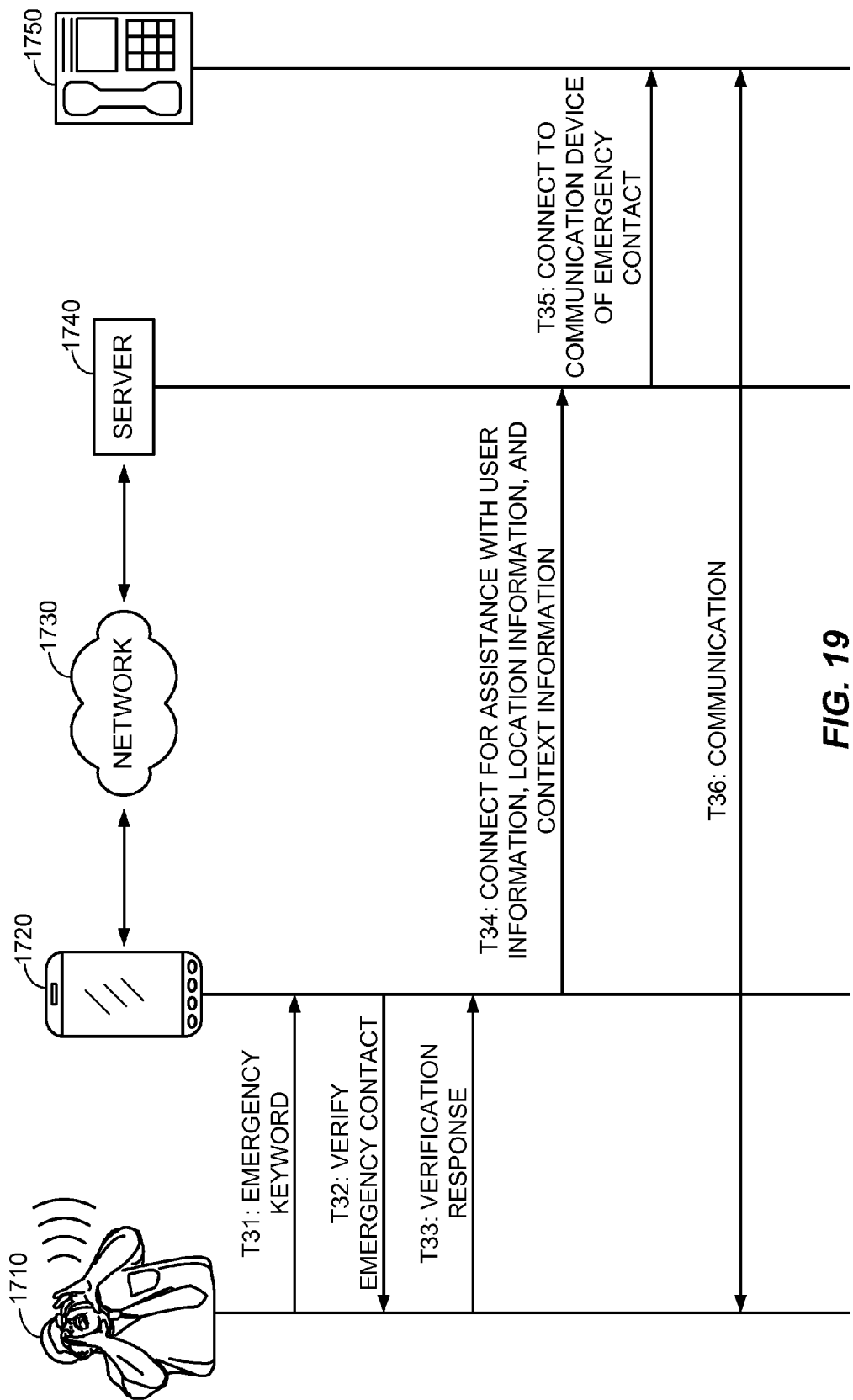
FIG. 19 illustrates a communication system in which a mobile device is configured to verify an emergency contact to be called for assistance in response to an emergency keyword and connect to the emergency contact for providing assistance.

In some embodiments, when the user 1710 speaks an emergency keyword, the mobile device 1720 verifies an emergency contact to be called for requesting assistance. FIG. 19 illustrates a method performed in a communication system in which the mobile device 1720 is configured to verify an emergency contact to be called for assistance in response to an emergency keyword from the user 1710, in one embodiment of the present disclosure. The mobile device 1720, the network 1730, and the emergency server 1740 illustrated in FIG. 19 are the same or similar units as those in FIG. 17.

When the user 1710 in an emergency event speaks a predetermined emergency keyword to initiate a request for assistance, at T31, the mobile device 1720 determines whether or not the spoken keyword matches the predetermined emergency keyword stored in the mobile device 1720. If the spoken keyword is determined to match the predetermined emergency keyword, the mobile device 1720 outputs a query to the user 1710 to verify the emergency contact to be called for requesting assistance, at T32. In one embodiment, the mobile device 1720 may ask the user 1710 a question such as "WHICH EMERGENCY PHONE NUMBER DO YOU WANT TO CALL: A, B, OR C." In another embodiment, the mobile device 1720 may further ask the user 1710 for a specific phone number by outputting a question such as "WHAT PHONE NUMBER DO YOU WANT TO CALL." In response to the verification query, the user 1710 verifies the emergency contact by providing a verbal answer of, for example, "A" or a specific phone number, at T33.

Upon receiving the user's answer, i.e., "A" or the specific phone number, the mobile device 1720 connects to the emergency server 1740 through the network 1730 for obtaining assistance, at T34. The mobile device 1720 provides at least one of user information, location information, and context information via a data communication network to the emergency server 1740 and also connects to the emergency server 1740 through a voice call. After obtaining the above information from the mobile device 1720, the emergency server 1740 connects the mobile device 1720 to the communication device 1750 of the emergency contact by forwarding the voice call, at T35. When the voice call is connected with the mobile device 1720, the communication device 1750 connects an emergency operator to the user 1710, at T36.

In one embodiment, the user 1710 may respond to the verification query with a specific phone number which is a contact not of an emergency management center but of a personal emergency contact, such as a close friend or relative. In such a case, the mobile device 1720 may directly connect to the contact, not via the emergency server 1740, to make a voice call between the user 1710 and the contact. In another embodiment, the mobile device 1720 may first verify the user's request for assistance as described above in FIG. 18, and if the request for the assistance is verified, then verify the personal emergency contact to be called as described here in FIG. 19.

Figure 20:
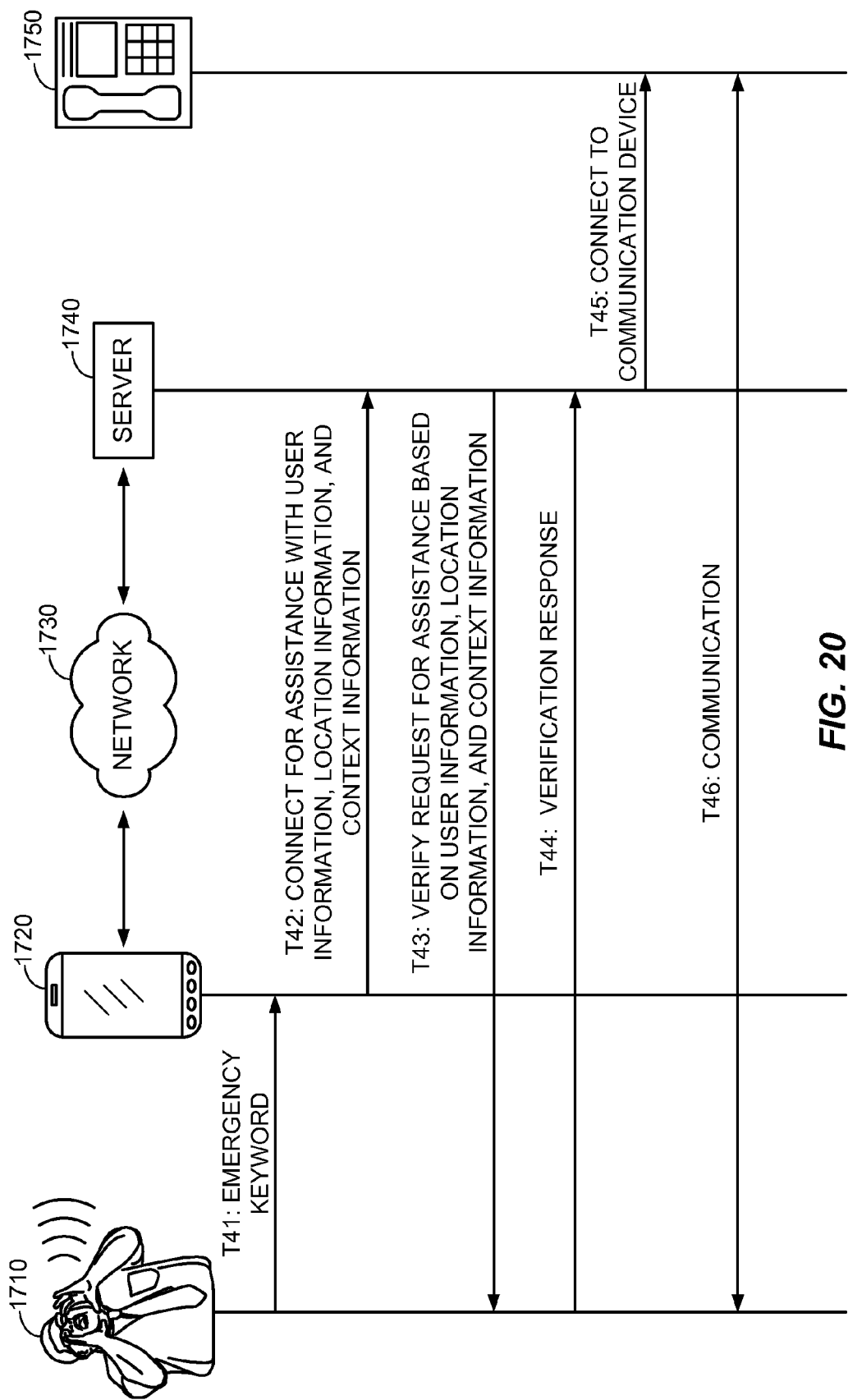
FIG. 20 illustrates a communication system in which an emergency server is configured to receive and verify a request for assistance from a mobile device and connect the mobile device to a communication device operated by an emergency operator for providing assistance.

In some embodiments, when the mobile device 1720 is connected to the emergency server 1740, the emergency server 1740 verifies whether the user 1710 seeks assistance. FIG. 20 illustrates a method performed in a communication system in which the emergency server 1740 is configured to receive and verify the user's request for assistance and to connect the mobile device 1720 to the communication device 1750 for providing assistance, in one embodiment of the present disclosure. In this embodiment, the user's request is verified through a voice call connection between the mobile device 1720 and the emergency server 1740. The mobile device 1720, the network 1730, and the emergency server 1740 illustrated in FIG. 20 are the same or similar units as those in FIG. 17.

When the user 1710 in an emergency event speaks a predetermined emergency keyword to initiate a request for assistance, at T41, the mobile device 1720 determines whether or not the spoken keyword matches the predetermined emergency keyword stored in the mobile device 1720. If the spoken keyword is determined to match the predetermined keyword, the mobile device 1720 connects to the emergency server 1740 and provides at least one of user information, location information, and context information, at T42. In addition to providing the above information, the mobile device 1720 may also connect to the emergency server 1740 through a voice call.

After obtaining the above information from the mobile device 1720, the emergency server 1740 accesses a list of questions for verification and presents one or more questions from the list to the user 1710 through the voice call connection to verify the request for the assistance, at T43. For example, the emergency server 1740 may ask the user 1710 one or more questions such as "DO YOU NEED EMERGENCY ASSISTANCE," "WHAT IS YOUR NAME," "WHERE ARE YOU," "ARE YOU MOVING," and "ARE YOU IN DARKNESS." At T44, the user 1710 answers each of the questions from the emergency server 1740 as a verification response. In response, for example, the user 1710 may answer the above questions by replying "YES," "MY NAME IS JOHN DOE," "I AM IN YOSEMITE NATIONAL PARK," "YES," and "IT'S VERY DARK AROUND," respectively.

Upon receiving the verification responses from the user 1710, the emergency server 1740 analyzes the responses based on a speech recognition application to verify the user's request for assistance. For verification, the emergency server 1740 may compare the recognized responses with at least one of the user information, the location information, and the context information. In one example, if the emergency server 1740 recognizes that the verification response includes a specific personal name, e.g., "JOHN DOE," the recognized name is compared with the user information. In another example, if the emergency server 1740 recognizes that the verification response includes a specific location, e.g., "YOSEMITE NATIONAL PARK," the recognized location is compared with the location information. In still another example, if the emergency server 1740 recognizes that the user's answer is "YES" in response to the question "ARE YOU IN DARKNESS," the answer is compared with information on a lighting condition included in the context information.

Based on one or more comparisons, the emergency server 1740 verifies the request for assistance. In one embodiment, the request for assistance is verified when all responses are consistent with the user information, the location information, and the context information. In another embodiment, the request for assistance is verified when a predetermined number of responses are consistent with a corresponding number of the user information, the location information, and the context information. In yet another embodiment, the emergency server 1740 may verify the request for assistance from the mobile device 1720 based on the relevancy of the user's responses to the verification questions. For example, if the user 1710 provides answers that are responsive to the verification questions, the request for assistance is verified. On the other hand, for example, if the emergency server 1740 asks for the location of the user 1710 but the user 1710 does not respond or provides a non-responsive answer, e.g., ("the weather is nice"), the request for assistance is not verified.

Upon verification, the emergency server 1740 connects the mobile device 1720 to an emergency operator via the communication device 1750 by forwarding the voice call, at T45. When the voice call is connected with the mobile device 1720, the emergency operator communicates with the user 1710, at T46, to assess the condition of the user 1710 and the emergency event. Based on the assessment on the user's condition and the emergency event, the emergency operator causes assistance to be rendered to the user 1710.

Figure 21:
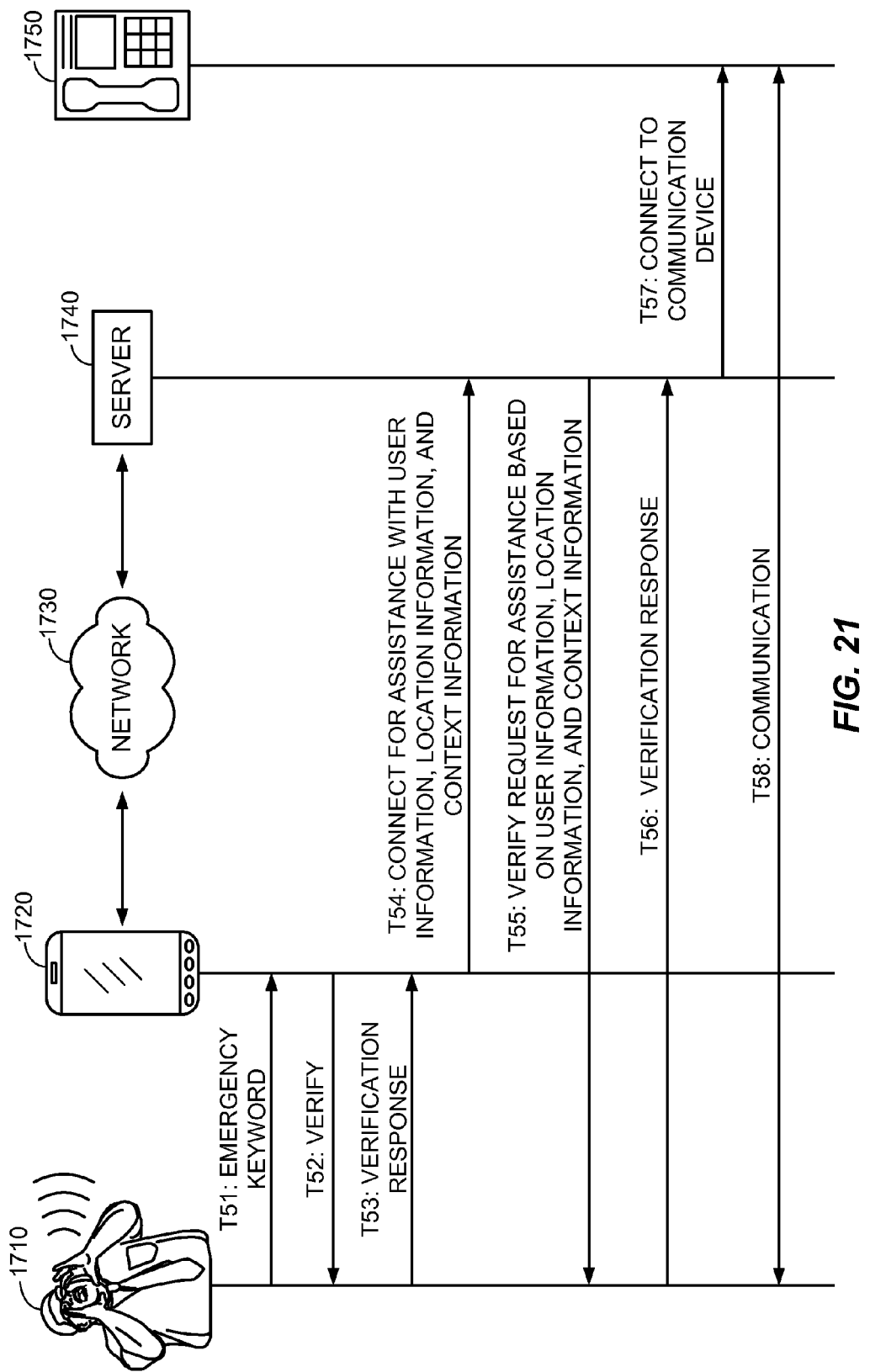
FIG. 21 illustrates a communication system in which an emergency server is configured to verify a request for assistance after verification of a mobile device in response to an emergency keyword.

In some embodiments, the emergency server 1740 verifies the user's request for assistance after verification of the mobile device 1720. FIG. 21 illustrates a method performed in a communication system in which the mobile device 1720 is configured to verify a request for assistance in response to an emergency keyword from the user 1710 and connect to the emergency server 1740 to verify the request for providing assistance, in one embodiment of the present disclosure. The mobile device 1720, the network 1730, and the emergency server 1740 illustrated in FIG. 21 are the same or similar units as those in FIG. 17.

When the user 1710 in an emergency event speaks a predetermined emergency keyword to initiate a request for assistance, at T51, the mobile device 1720 determines whether or not the spoken keyword matches the predetermined emergency keyword stored in the mobile device 1720. If the spoken keyword is determined to match the predetermined emergency keyword, the mobile device 1720 outputs a query to the user 1710 to verify the user's request for assistance, at T53, as described above in FIG. 18. In some embodiments, the mobile device 1720 may output a query to the user to verify an emergency contact to be called, at T53, as described in FIG. 19.

Upon completing the verification, the mobile device 1720 connects to the emergency server 1740 through the network 1730 for obtaining assistance, at T54. Over the connection, the mobile device 1720 provides at least one of user information, location information, and context information. In addition, the mobile device 1720 connects to the emergency server 1740 through a voice call. After obtaining the above information from the mobile device 1720, the emergency server 1740 asks one or more verification questions to the user 1710 through the voice call connection, at T55, and the user 1710 answers each of the questions as a verification response, at T56, as described above in FIG. 20. If the user's request for assistance is verified, the emergency server 1740 connects the mobile device 1720 to the communication device 1750, at T57, and an emergency operator communicates with the user 1710 via the communication device 1750, at T58, to assess the condition of the user 1710 and the emergency event.

Figure 22:
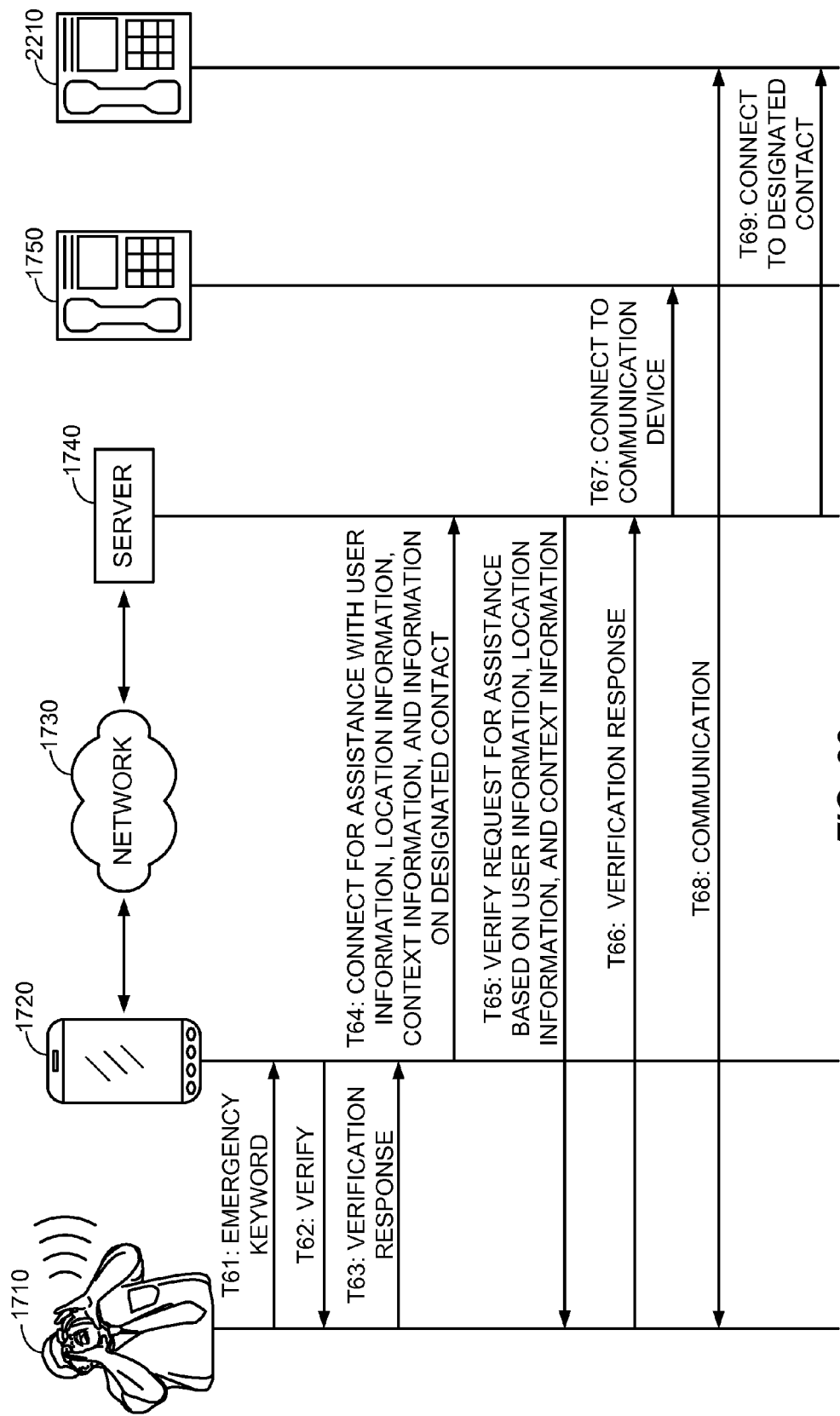
FIG. 22 illustrates a communication system in which an emergency server is configured to communicate with a designated contact stored in a mobile device when a request for assistance is verified.

In some embodiments, the mobile device 1720 of FIG. 21 may designate a personal contact to be called in the event of emergency, and the emergency server 1740 may automatically communicate with the designated personal contact. FIG. 22 illustrates a method performed in a communication system in which the emergency server 1740 is configured to communicate with a designated personal contact stored in the mobile device 1720 when a request for assistance is verified, in one embodiment of the present disclosure. The mobile device 1720, the network 1730, and the emergency server 1740 illustrated in FIG. 22 are the same or similar units as those in FIG. 17.

In the illustrated embodiment, the user 1710 stores at least one contact in the mobile device 1720 to be called in the event of emergency. The contact may include a close friend or relative of the user 1710. In the same or similar manner as described in FIG. 21, the user 1710 speaks a predetermined emergency keyword, the mobile device 1720 outputs a query for verification, and the user 1710 responds to the verification query, at T61 to T63. After the above verification process, the mobile device 1720 provides the emergency server 1740 with information on the designated contact in addition to providing at least one of user information, location information, and context information and establishing a voice call.

After receiving the above information, the emergency server 1740 sends verification questions to the user 1710, at T65, and the user 1710 responds to each of the questions, at T66. Once the user's request for assistance is verified based on the user's responses, the emergency server 1740 connects the mobile device 1720 to the communication device 1750, at T67, and an emergency operator communicates with the user 1710 via the communication device 1750, at T68. In addition to the above connection to the communication device 1750, the emergency server 1740 connects to another communication device 610 of the designated contact to notify him or her of the emergency event for the user 1710, at T69. For example, the emergency server 1740 may send a text message to the communication device 610 with a call-back phone number of the user 1710 and a short message indicating that the user 1710 is in need of assistance.

Figure 23:
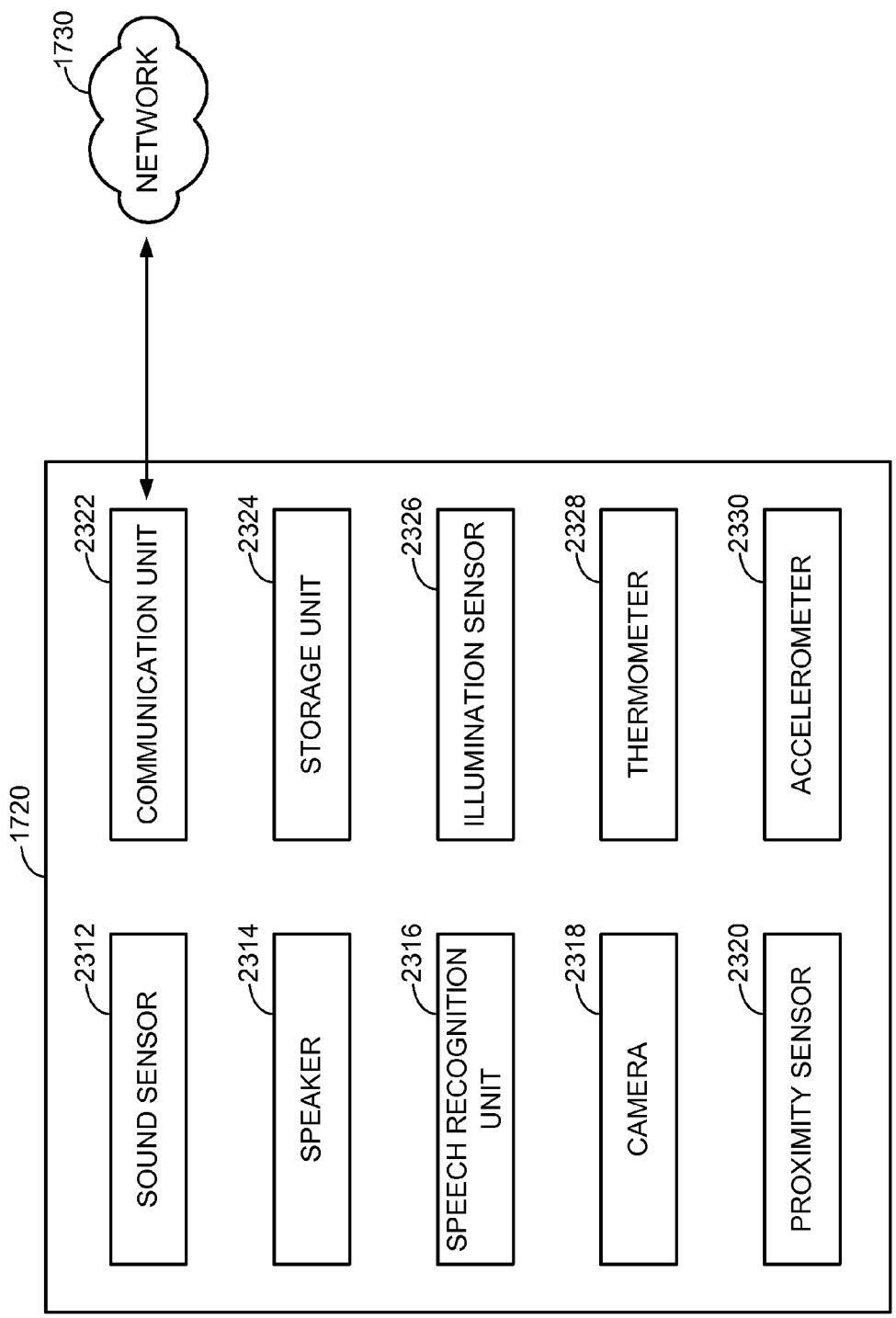
FIG. 23 is a block diagram of a mobile device configured to capture an emergency keyword and connect to an emergency server through a network.

FIG. 23 is a block diagram of the mobile device 1720 configured to capture an emergency keyword and connect to the emergency server 1740 through the network 1730, in one embodiment of the present disclosure. The mobile device 1720 may be any suitable device, such as a cellular phone, a smartphone, a laptop computer, or a tablet personal computer equipped with sound capturing capability, e.g., a microphone, and communications capability through a data and/or a communications network. Further, the mobile device 1720 is equipped with data storing capability, i.e., a storage unit such as a RAM (Random Access Memory), a ROM (Read-Only Memory), an EEPROM (Electrically Erasable Programmable Read-Only Memory), or a flash memory to store various types of information and data such as user identification information, phone numbers, pictures, videos, and the like. In addition, the mobile device 1720 may be equipped with speech recognition capability to be able to parse speech of the user 1710 captured by the microphone to determine out words included in the speech.

Specifically, the mobile device 1720 may include a sound sensor 2312, a speaker 2314, a speech recognition unit 2316, a camera 2318, a proximity sensor 2320, a communication unit 2322, a storage unit 2324, an illumination sensor 2326, a thermometer 2328, and an accelerometer 2330. The sound sensor 2312 is configured to capture an input sound having at least one unique sound feature, which can be used for recognizing speech of the user 1710. For example, the sound sensor 2312 may include one or more microphones or any other types of sound sensors used to detect, sense, and/or capture the ambient sound of the surroundings. The sound sensor 2312 may be a microphone built into the mobile device 1720 for telephone calls or recording videos, or a microphone dedicated to receive ambient sound. The sound sensor 2312 provides the speech recognition unit 2316 with the received input sound, and the speech recognition unit 2316 then analyzes the input sound, for example, based on a speech recognition application, to determine whether the input sound matches a predetermined emergency keyword, to verify a user's request for assistance, or to verify an emergency contact to be called.

The speaker 2314 is configured to output a sound to the user 1710 to ask questions for verifying a request for assistance and an emergency contact to be called. The speaker 2314 may be built into the mobile device 1720 for telephone calls, or may be a speaker dedicated to output such questions. The camera 2318 may be an embedded digital camera for taking pictures and videos of the surroundings of the mobile device 1720. The proximity sensor 2320 is configured to detect an object located close to the user, for example, using technologies relating to magnetic, optical, or capacitive characteristics. The illumination sensor 2326 is configured to sense a lighting condition, i.e., brightness, of the surroundings of the mobile device 1720. In addition, the thermometer 2328 and the accelerometer 2330 measure the temperature of the surroundings and the acceleration of the mobile device 1720, respectively. In some embodiments, the above operations of the camera 2318, the proximity sensor 2320, the illumination sensor 2326, the thermometer 2328, and the accelerometer 2330 may be initiated in response to the determination by the speech recognition unit 2316 that the input sound matches the predetermined emergency keyword. In the above embodiment, information relating to the environmental context of the mobile device 1720 such as pictures, videos, lighting condition, temperature, acceleration, sound, and the like are collectively referred to as context information.

The storage unit 2324 stores user information such as a name, a phone number, a photo, an e-mail address, health information (e.g., a blood type, a pre-existing medical condition, and the like) of the user 1710, contact information such as phone numbers, e-mail addresses, and the like of others, and identification information of the mobile device 1720 such as IMEI (International Mobile Equipment Identity) or a model number. The storage unit 2324 may further store location information of the mobile device 1720 such as an address, latitude and longitude, that can be provided by a location tracking unit or application in the mobile device 1720. For example, the location can be identified using a GPS (Global Positioning System) (not shown) embedded in the mobile device 1720, a Wi-Fi access point to which the mobile device 1720 is connected, a cell ID designated by a base station with which the mobile device 1720 communicates, and the like. The communication unit 2322 is configured to connect to the emergency server 1740 through the network 1730 in order to provide the user information, the location information, or the context information. In addition to providing the above information, the mobile device 1720 may also connect to the emergency server 1740 via a voice call using the communication unit 2322.

In some embodiments, the mobile device 1720 may be configured to automatically perform sound processing functions without requiring user intervention. In other words, the user 1710 does not need to initiate performance of the functions on the mobile device 1720, such as determining whether an emergency keyword received from a user matches a predetermined emergency keyword stored in the mobile device as described in FIG. 17. In this case, the sound sensor 2312 of the mobile device 1720 may, for example, capture environmental sounds continuously to recognize a predetermined emergency keyword and to request assistance. However, while the mobile device 1720 operates to capture and process environmental sounds continuously, power is generally consumed from a battery, which is typically limited in capacity. Thus, in order to conserve the battery, power consumption of the mobile device 1720 may be reduced by operating in a low-power mode, as described in some other embodiments below.

In some other embodiments, the sound sensor 2312 of the mobile device 1720 may capture an environmental sound during a predetermined time intervals to reduce power consumption. In this case, components in the mobile device 1720 that are used to capture or process the environmental sound may be activated during the predetermined time intervals (e.g., sound with a duration of 10 ms at an interval of 100 ms). For example, such components may be configured to be in an "active state" (i.e., in a high-power state) for 10 ms and in an "idle state" (i.e., in a low-power state or off state) for the next 90 ms. In the idle state, the components that are used for capturing or processing environmental sounds are inactive for 90% of the duty cycle. Thus, in such a case, the mobile device 1720 may save as much as 90% of power in sound processing as compared to the case of capturing and processing environmental sounds continuously.

Figure 24:
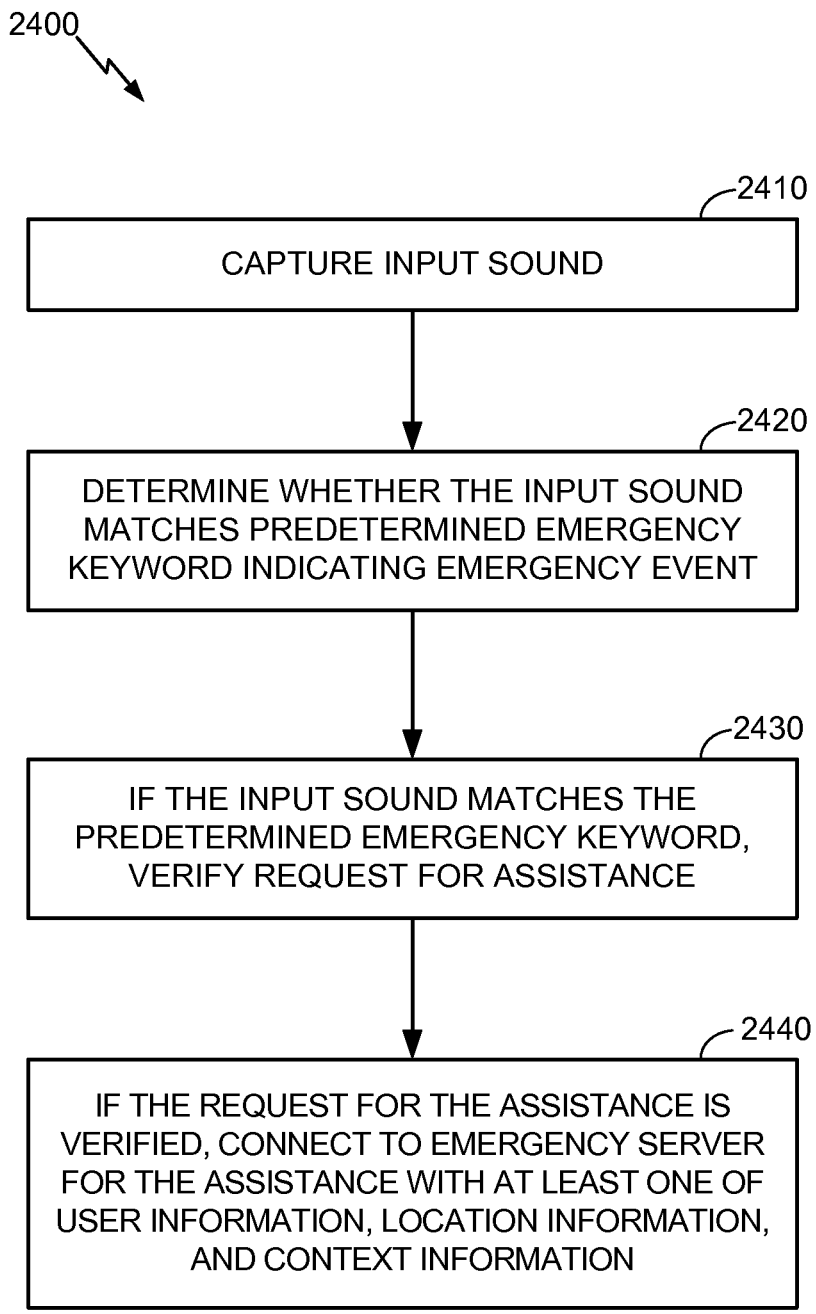
FIG. 24 is a flowchart of a method, performed by a mobile device, for capturing an emergency keyword and connecting to an emergency server.

FIG. 24 is a flowchart of a method 2400, performed by the mobile device 1720, for capturing an emergency keyword and connecting to the emergency server 1740, in one embodiment of the present disclosure. Initially, the mobile device 1720 captures an input sound from the user 1710, at 2410. The mobile device 1720 processes the input sound to determine whether the input sound matches a predetermined emergency keyword indicating that the user 1710 requests assistance in an emergency event, at 2420. If the input sound is determined to match the predetermined emergency keyword, the mobile device 1720 verifies a request for the assistance, at 2430, as described above in FIG. 18. If the request for the assistance is verified, the mobile device 1720 connects to the emergency server 1740 for assistance and provides at least one of user information, location information, and context information to the emergency server 1740, at 2440. In another embodiment, the verification of the request for assistance may be omitted as described above in FIGS. 17 and 20. In yet another embodiment, the above verification may be replaced with verification of an emergency contact to be called as described above in FIG. 19.

Figure 25:
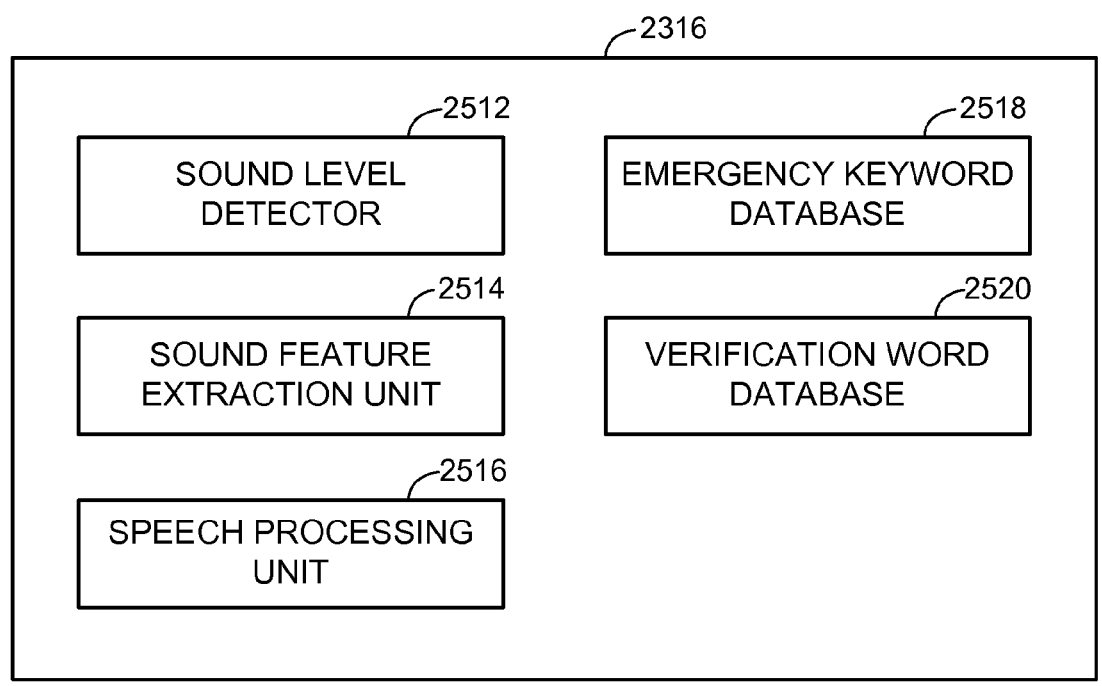
FIG. 25 is a block diagram of a speech recognition unit of a mobile device that is configured to recognize an input sound received by the mobile device.

FIG. 25 is a block diagram of the speech recognition unit 2316 of the mobile device 1720 that is configured to recognize an input sound received by the mobile device 1720, according to one embodiment of the present disclosure. The speech recognition unit 2316 may include a sound level detector 2512, a sound feature extraction unit 2514, a speech processing unit 2516, an emergency keyword database 2518, and a verification word database 2520. For speech recognition, the sound level detector 2512 receives the input sound from the sound sensor 2312 as described in FIG. 23.

The sound level detector 2512 is configured to determine a sound level of the input sound (e.g., power level). If the sound level exceeds a threshold sound level, the sound feature extraction unit 2514 extracts a unique sound feature (e.g., audio fingerprint or sound signature) from the input sound by using any suitable signal processing methods for speech and audio recognition and analysis. For example, such methods may implement spectrum analysis, MFCC (Mel-frequency cepstral coefficients), LPC (linear predictive coding), and/or LSP (line spectral pair) techniques, which are methods for audio fingerprinting, speech recognition or speech and audio processing.

A sound feature may be represented by any suitable sets of values that uniquely describes or represents a specific sound. For example, the set of values may correspond to a frequency domain spectrum, a power domain spectrum, or the like. Thus, the specific sound is characterized by a sound feature which uniquely describes or represents the sound and may include an audio fingerprint, a sound signature, or any other sound identifier.

The sound level detector 2512 may also be configured to determine whether a captured sound is a human voice. In one embodiment, the sound level detector 2512 may include a digital signal processor ("DSP") to determine whether a captured sound is a human voice as opposed to other types of sounds such as instrumental music or noise. For example, when the sound level of the captured sound is determined to exceed the threshold sound level, the DSP may be activated to determine whether or not the captured sound includes human voice by using any suitable signal processing method, such as Gaussian Mixture Model with MFCC (Mel-frequency cepstral coefficients). If the DSP determines that the captured sound includes human voice, the captured sound is provided to the sound feature extraction unit 2514 for further processing as will be described below. On the other hand, if the DSP determines that the captured sound does not include human voice, the captured sound is discarded.

The emergency keyword database 2518 stores a predetermined emergency keyword indicating a request for assistance in an emergency event. The emergency keyword may be assigned and stored in advance by a manufacturer of the mobile device 1720 or a provider of an associated application program. The emergency keyword database 2518 may also store a reference sound feature corresponding to the predetermined emergency keyword that can be compared with an extracted sound feature from the input sound for speech recognition.

In some embodiments, the user 1710 may assign and store the emergency keyword in the emergency keyword database 2518. For example, the user 1710 may input one or more words as an emergency keyword through an input device such as a touch screen keyboard. The inputted emergency keyword may be processed to generate a reference sound feature, which is stored in the emergency keyword database 2518 with the emergency keyword. In another embodiment, the user 1710 may speak and record one or more words as an emergency keyword with a voice input device such as a microphone of the mobile device 1720. Such a recording process of the emergency keyword may be repeated as needed for training. A reference sound feature may be extracted from the recorded speech and stored in the emergency keyword database 2518.

The speech processing unit 2516 is configured to access the emergency keyword database 2518 to determine whether the input sound from the user 1710 matches the predetermined emergency keyword. If the extracted sound feature from the input sound has a degree of similarity to the reference sound feature stored in the emergency keyword database 2518 that exceeds a similarity threshold, the input sound may be determined to match the predetermined emergency keyword. In one embodiment, the degree of the similarity between the extracted sound feature of the input sound and the stored reference sound feature may be calculated based on a Euclidean distance between the sets of values respectively representing the sound features. If the degree of the similarity exceeds the similarity threshold, the input sound may be determined to match the predetermined emergency keyword.

In addition, the verification word database 2520 includes words that are used in questions and answers for verification. The verification word database 2520 may also include reference sound features of the words which may be used in the answers. Similar to the verification of the emergency keyword described above, the speech processing unit 2516 may access the verification word database 2520 to recognize answers of the user 1710. For example, the sound feature extraction unit 2514 extracts a sound feature from an input sound of the user's response and the speech processing unit 2516 compares the extracted sound feature with each of the stored reference sound features to recognize the user's response. In one embodiment, one of the words whose reference sound feature has a greatest degree of similarity to the extracted sound feature is identified as a word included in the user's response. This process may be repeated as needed when the response includes a plurality of words to recognize the user's response.

Figure 26:
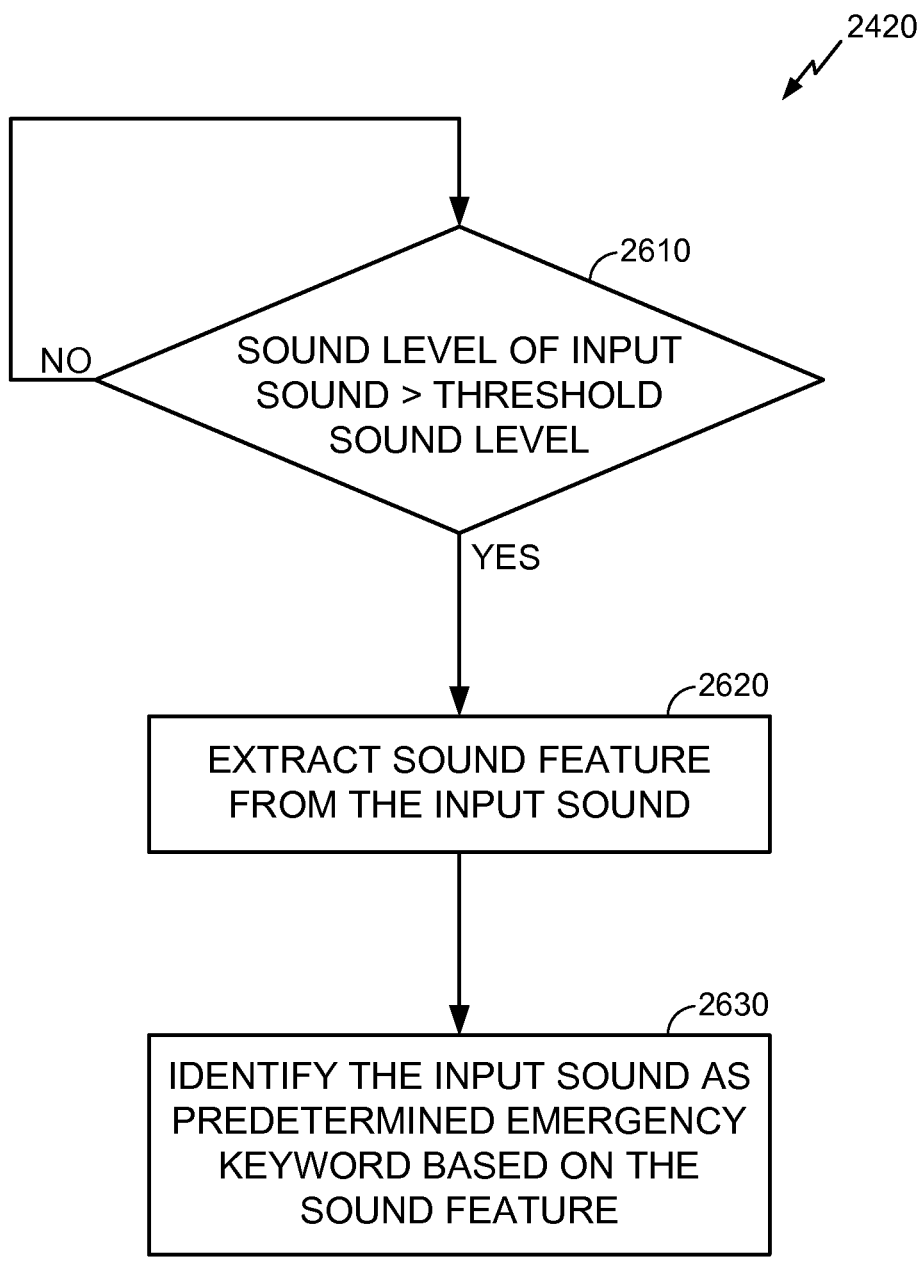
FIG. 26 is a flowchart of a method, performed by the speech recognition unit, for extracting a sound feature from an input sound and identifying the input sound as a predetermined keyword.

FIG. 26 is a flowchart of a detailed method 2420, performed by the speech recognition unit 2316, for extracting a sound feature from an input sound and identifying the input sound as a predetermined keyword, in one embodiment of the present disclosure. Initially, the sound level detector 2512 determines a sound level of the input sound received from the sound sensor 2312 and determines whether or not the sound level of the input sound exceeds a threshold sound level, at 2610. If the sound level of the input sound does not exceed the threshold sound level, the process proceeds back to 2610. If the sound level of the input sound exceeds the threshold sound level, the sound feature extraction unit 2514 extracts a sound feature from the input sound, at 2620. The speech processing unit 2516 identifies the input sound as the predetermined emergency keyword based on the extracted sound feature, at 2630. In a similar manner to the above, in the verification of a request for assistance or an emergency contact to be called, the speech processing unit 2516 may extract a sound feature from the verification response of the user 1710 and recognize the words included in the response.

Figure 27:
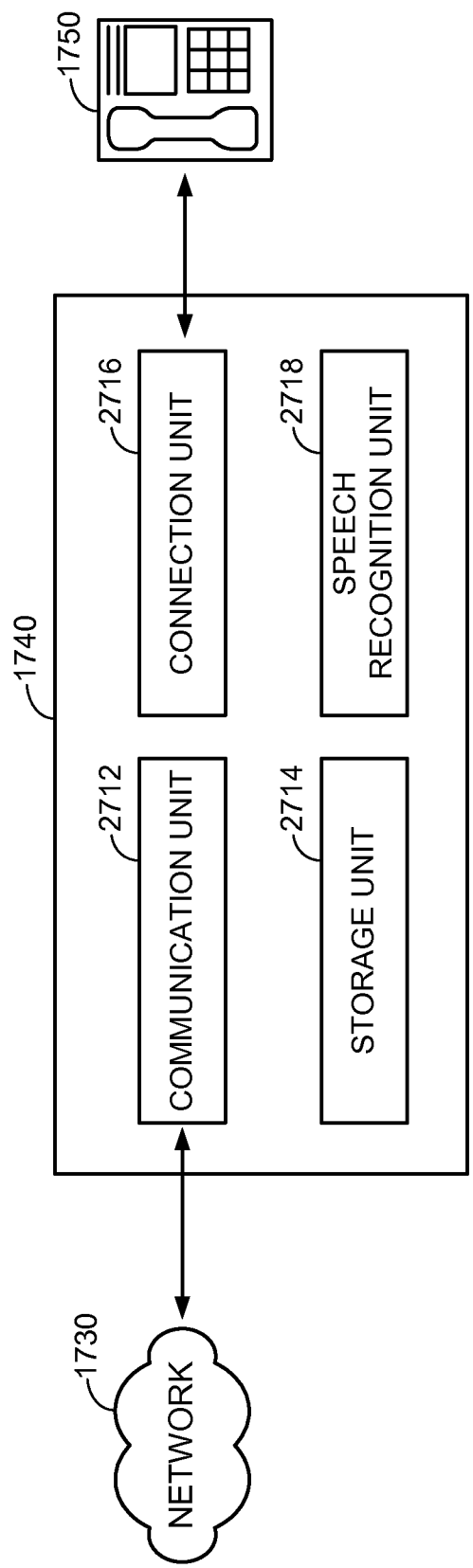
FIG. 27 is a block diagram of an emergency server configured to communicate with a mobile device through a network and connect the mobile device to a communication device operated by an emergency operator.

FIG. 27 is a block diagram of the emergency server 1740 configured to communicate with the mobile device 1720 through the network 1730 and to connect the mobile device 1720 to the communication device 1750 operated by an emergency operator, in one embodiment of the present disclosure. The emergency server 1740 may include a communication unit 2712, a storage unit 2714, a connection unit 2716, and a speech recognition unit 2718. The storage unit 2714 may be any suitable type of a memory such as a RAM, a ROM, an EEPROM, or a flash memory.

The communication unit 2712 is configured to connect to the mobile device 1720 through the network 1730 in order to receive user information, location information, and context information of the mobile device 1720. Further, the communication unit 2712 may receive information relating to an emergency contact, that is verified by the user 1710, to be called for requesting assistance from the mobile device 1720. The communication unit 2712 may also receive information relating to a designated contact to be notified of the emergency event, the designated contact stored in the mobile device 1720 by the user 1710 in advance. In addition to the data connection, the emergency server 1740 may also be connected to the mobile device 1720 through a voice call using the communication unit 2712. The above received information may be stored in the storage unit 2714 to be accessed for verification and may also be stored for use in tracking the mobile device 1720 in the event the connection to the mobile device 1720 is lost or terminated.

In addition, the communication unit 2712 is configured to forward one or more questions to the mobile device 1720 over the voice call via the network 1730 for verification. If the user

1710 responds to the verification questions, the communication unit 2712 receives the user's responses from the mobile device 1720. Upon receiving the responses, the communication unit 2712 provides the responses to the speech recognition unit 2718 and the speech recognition unit 2718 analyzes the responses based on a speech recognition application to verify the user's request for assistance.

In one embodiment, similar to the speech recognition unit 2316 of the mobile device 1720 as described above in FIG. 25, the speech recognition unit 2718 of the emergency server 1740 may include a verification word database, a sound feature extraction unit, and a speech processing unit. The verification word database may be configured to include words that are used in questions and answers for verification and also reference sound features of the words which may be used in the answers. Similar to the verification of the mobile device 1720 as described above in FIG. 25, the sound feature extraction unit extracts a sound feature from the user's response and the speech processing unit compares the extracted sound feature with each of the stored reference sound features to recognize the user's response. In one embodiment, one of the words whose reference sound feature has a greatest degree of similarity to the extracted sound feature is identified as a word included in the user's response. In another embodiment, the speech processing unit may verify the request for assistance based on whether the user's answers are responsive to the verification questions, as described above in FIG. 21.

Once the user's request for assistance is verified, the connection unit 2716 connects to the communication device 1750 so that an emergency operator communicates with the user 1710. On the other hand, if the request for assistance is not verified, the emergency server 1740 terminates communication with the mobile device 1720 and takes no further action. In some embodiments, if the mobile device 1720 provides the emergency server 1740 with communication information of a contact to be notified in the emergency event, the communication unit 2712 may send a text message to the contact with a call-back phone number of the user 1710 and a short message indicating that the user 1710 is in need of assistance.

Figure 28:
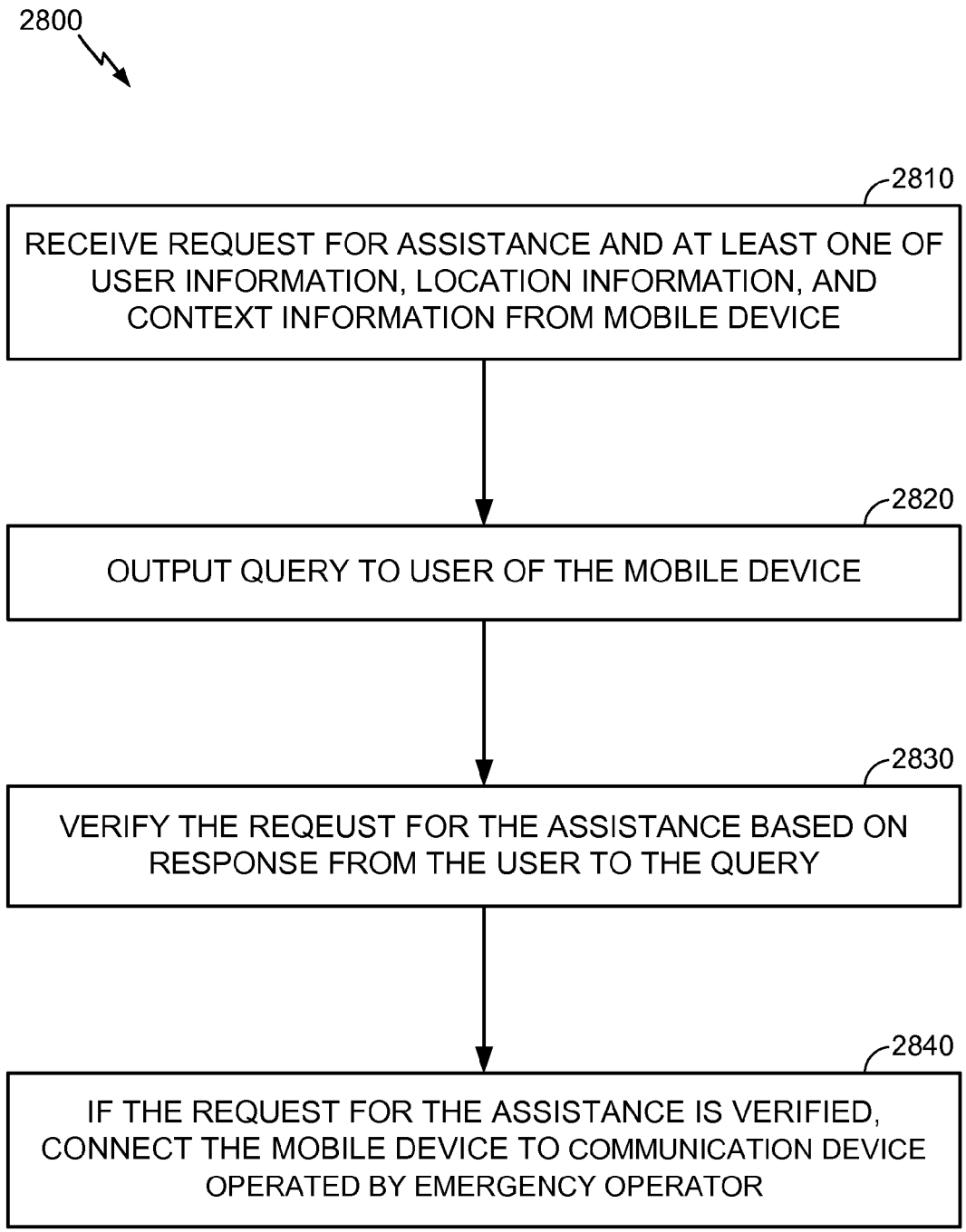
FIG. 28 is a flowchart of a method, performed by an emergency server, for communicating with a mobile device and connecting the mobile device to a communication device operated by an emergency operator.

FIG. 28 is a flowchart of a method 2800, performed by the emergency server 1740, for communicating with the mobile device 1720 and connecting the mobile device 1720 to the communication device 1750, in one embodiment of the present disclosure. Initially, the emergency server 1740 receives a request for assistance and at least one of user information, location information, and context information from the mobile device 1720 via the network 1730, at 2810. Upon receiving the above information, the emergency server 1740 outputs a verification query to the user 1710 of the mobile device 1720 via the network 1730, at 2820. Upon receiving a verbal response to the verification query from the user 1710 via the mobile device 1720 and the network 1730, the emergency server 1740 verifies the request for assistance based on the verification response from the user 1710, at 2830. If the request for assistance is verified, the emergency server 1740 connects the mobile device 1720 to the communication device 1750 to provide appropriate assistance to the user 1710, at 2840.

Figure 29:
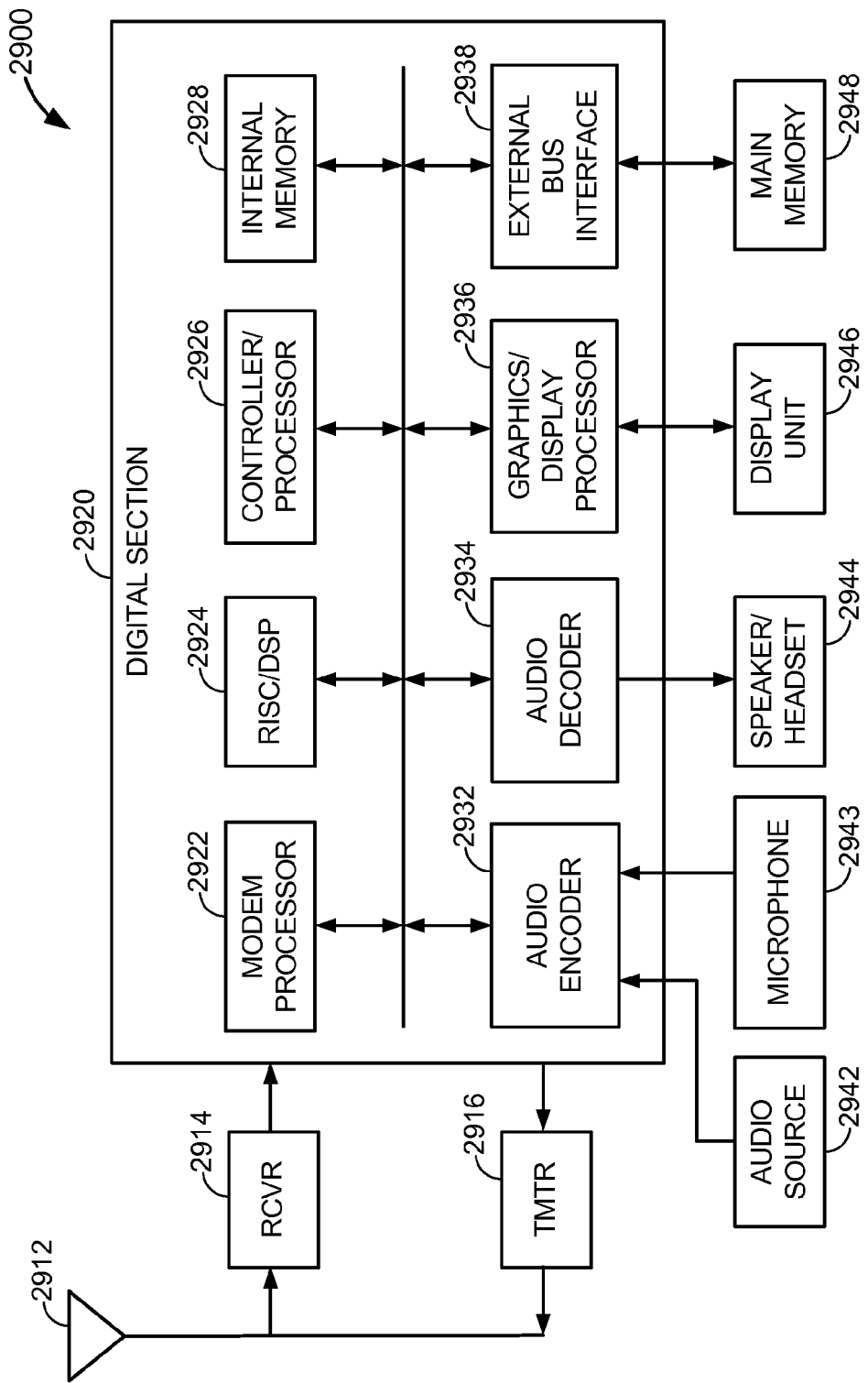
FIG. 29 is a block diagram of an exemplary mobile device in which the methods and apparatus for communicating emergency messages of the present disclosure may be implemented.

FIG. 29 illustrates a configuration of an exemplary mobile device 2900 in which the method or application of the present disclosure may be executed. The configuration of the mobile device 2900 may be implemented in the mobile devices according to the above embodiments described with reference to FIGS. 1 to 28. The mobile device 2900 may be a cellular phone, a smartphone, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the mobile device 2900 may communicate directly with another mobile device, e.g., using Wi-Fi Direct, Bluetooth, or FlashLinq technology.

The mobile device 2900 is capable of providing bidirectional communication via a receive path and a transmit path. On the receive path, signals transmitted by base stations are received by an antenna 2912 and are provided to a receiver (RCVR) 2914. The receiver 2914 conditions and digitizes the received signal and provides samples such as the conditioned and digitized digital signal to a digital section for further processing. On the transmit path, a transmitter (TMTR) 2916 receives data to be transmitted from a digital section 2920, processes and conditions the data, and generates a modulated signal, which is transmitted via the antenna 2912 to the base stations. The receiver 2914 and the transmitter 2916 may be part of a transceiver that may support CDMA, GSM, LTE, LTE Advanced, etc.

The digital section 2920 includes various processing, interface, and memory units such as, for example, a modem processor 2922, a reduced instruction set computer/digital signal processor (RISC/DSP) 2924, a controller/processor 2926, an internal memory 2928, a generalized audio encoder 2932, a generalized audio decoder 2934, a graphics/display processor 2936, and an external bus interface (EBI) 2938. The modem processor 2922 may perform processing for data transmission and reception, e.g., encoding, modulation, demodulation, and decoding. The RISC/DSP 2924 may perform general and specialized processing for the mobile device 2900. The controller/processor 2926 may perform the operation of various processing and interface units within the digital section 2920. The internal memory 2928 may store data and/or instructions for various units within the digital section 2920.

The generalized audio encoder 2932 may perform encoding for input signals from an audio source 2942, a microphone 2943, etc. The generalized audio decoder 2934 may perform decoding for coded audio data and may provide output signals to a speaker/headset 2944. The graphics/display processor 2936 may perform processing for graphics, videos, images, and texts, which may be presented to a display unit 2946. The EBI 2938 may facilitate transfer of data between the digital section 2920 and a database 2948.

The digital section 2920 may be implemented with one or more processors, DSPs, microprocessors, RISCs, etc. The digital section 2920 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 30:
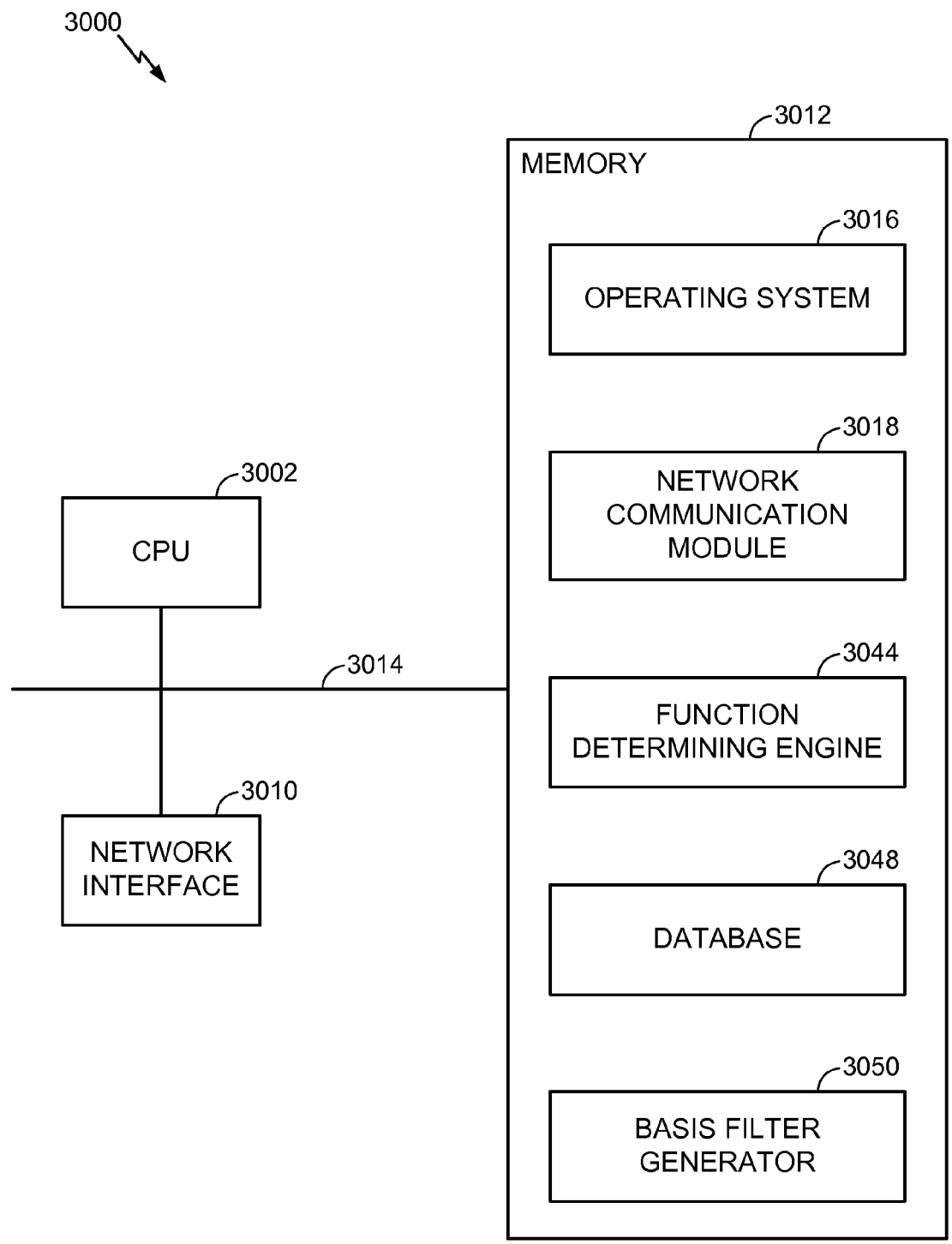
FIG. 30 is a block diagram illustrating a server system, which may be any one of the servers previously described, for providing assistance in an emergency event.

FIG. 30 is a block diagram illustrating a server system 3000, which may be any one of the servers previously described, for providing assistance in an emergency event implemented in accordance with some embodiments. The server system 3000 may include one or more processing units (CPU's) 3002, one or more network or other communications network interfaces 3010, a memory 3012, and one or more communication buses 3014 for interconnecting these components. The server system 3000 may also include a user interface (not shown) having a display device and a keyboard.

The memory 3012 may be any suitable memory, such as a high-speed random access memory, (e.g., DRAM, SRAM, DDR RAM or other random access solid state memory devices). The memory 3012 may include or may alternatively be non-volatile memory (e.g., one or more magnetic disk storage devices, optical disk storage devices, flash memory storage devices, or other non-volatile solid state storage devices). In some embodiments, the memory 3012 may include one or more storage devices remotely located from the CPU(s) 3002 and/or remotely located in multiple sites.

Any one of the above memory devices represented by the memory 3012 may store any number of modules or programs that corresponds to a set of instructions for performing and/or executing any of the processes, operations, and methods previously described. For example, the memory 3012 may include an operating system 3016 configured to store instructions that includes procedures for handling various basic system services and for performing hardware dependent tasks. A network communication module 3018 of the memory 3012 may be used for connecting the server system 3000 to other computers via the one or more communication network interfaces 3010 (wired or wireless) and one or more communication networks, such as the Internet, other wide area networks, local area networks, metropolitan area networks, and so on. The memory 3012 may also include a function determining engine 3044 configured to determine a function from a reference sound feature of a media sound with which the function is associated and a basis filter generator 3050 configured to generate and update basis filters for extracting sound features. The function determining engine 3044 and the basis filter generator 3050 may access a database 3048 configured to store reference sound feature data, basis filter data, and/or sample sound data.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 3012 may store additional modules and data structures not described above.

What is claimed:

1. A method, performed at a mobile device, for responding to an emergency event, the method comprising:
   receiving an alarm signal including information related to the emergency event, wherein the alarm signal includes a first signal and a second signal, and wherein the first signal includes an audible sound and the second signal includes at least one of an alarm device identification (ID) of an alarm device or an emergency code of the emergency event;
   transmitting, to a server, identification information of the mobile device and the information;
   receiving, from the server, an instruction for responding to the emergency event; and
   outputting the instruction.

2. The method of claim 1, wherein the second signal includes an audio watermark, and wherein the audio watermark includes the information related to the emergency event.

3. The method of claim 2, wherein the audio watermark is a near-ultrasound signal.

4. The method of claim 1, wherein the identification information includes at least one of the alarm device ID or the emergency code.

5. The method of claim 1, wherein the audible sound includes at least one of a siren or a bell.

6. The method of claim 1, wherein the identification information includes at least one of a location, an identification number, or and a callback number of the mobile device.

7. The method of claim 1, wherein the identification information includes context data associated with the mobile device and the emergency event.

8. The method of claim 1, wherein the instruction includes at least one of a map indicating locations of the alarm device and the mobile device or an evacuation route.

9. The method of claim 1, further comprising:
   determining that at least one other mobile device is operable to communicate with the mobile device;
   transmitting identification information of the at least one other mobile device to the server;
   receiving a second instruction for responding to the emergency event for the at least one other mobile device from the server; and
   transmitting, to the at least one other mobile device, the second instruction for the at least one other mobile device.

10. The method of claim 1, wherein outputting the instruction includes outputting the instruction via a display or a speaker of the mobile device.

11. A mobile device comprising:
    a sensor configured to receive an alarm signal including information related to an emergency event, wherein the alarm signal includes a first signal and a second signal, and wherein the first signal includes an audible sound and the second signal includes at least one of an alarm device identification (ID) of an alarm device or an emergency code of the emergency event;
    a communication unit configured to transmit, to a server, identification information of the mobile device and the information related to the emergency event;
    a receiving unit configured to receive an instruction for responding to the emergency event from the server; and
    an output unit configured to output the instruction.

12. The mobile device of claim 11, wherein the second signal includes an audio watermark, and wherein the audio watermark includes the information related to the emergency event.

13. The mobile device of claim 12, wherein the audio watermark is a near-ultrasound signal.

14. The mobile device of claim 11, wherein the identification related to the emergency event includes at least one of the alarm device ID or the emergency code.

15. The mobile device of claim 11, wherein the audible sound includes one of a siren or a bell.

16. The mobile device of claim 11, wherein the identification information includes at least one of a location, an identification number, or a callback number of the mobile device.

17. The mobile device of claim 11, wherein the identification information includes context data associated with at least one of the mobile device or the emergency event.

18. The mobile device of claim 11, wherein the instruction includes at least one of a map indicating locations of the alarm device and the mobile device or an evacuation route.

19. The mobile device of claim 11, further comprising a sensor configured to determine that at least one other mobile device is operable to communicate with the mobile device.

20. The mobile device of claim 11, wherein the communication unit is further configured to transmit identification information of at least one other mobile device to the server and to transmit a second instruction for responding to the emergency event to the at least one other mobile device.

21. The mobile device of claim 11, wherein the output unit is further configured to output the instruction via a display or a speaker of the mobile device.

22. A mobile device comprising:
    means for receiving an alarm signal including information related to an emergency event, wherein the alarm signal includes a first signal and a second signal, and wherein the first signal includes an audible sound and the second signal includes at least one of an alarm device identification (ID) or an emergency code of the emergency event;

means for transmitting, to a server, identification information of the mobile device and the information related to the emergency event;
means for receiving, from the server, an instruction for responding to the emergency event; and
means for outputting the instruction.

23. The mobile device of claim 22, further comprising means for determining that at least one other mobile device is operable to communicate with the mobile device.

24. The mobile device of claim 22, wherein the means for transmitting the identification information is further configured to transmit identification information of at least one other mobile device to the server, and a second instruction for responding to the emergency event to the at least one other mobile device.

25. A computer-readable storage device comprising instructions for responding to an emergency event, the instructions causing a processor of a mobile device to perform operations comprising:
receiving an alarm signal including information related to the emergency event, wherein the alarm signal includes a first signal and a second signal, and wherein the first signal includes an audible sound and the second signal includes at least one of an alarm device identification (ID) or an emergency code of the emergency event;
initiating transmission of identification information of the mobile device and the information to a server;
receiving, from the server, an instruction for responding to the emergency event; and
outputting the instruction.

26. The device of claim 25, wherein the operations further comprise:
determining that at least one other mobile device is operable to communicate with the mobile device;
initiating transmission of identification information of the at least one other mobile device to the server;
receiving a second instruction for responding to the emergency event for the at least one other mobile device from the server; and
initiating transmission of the second instruction for the at least one other mobile device to the at least one other mobile device.

27. A method performed at a server for providing assistance in an emergency event, the method comprising:
receiving, from a first mobile device, information related to the emergency event and identification information of the first mobile device, wherein the information is included in an alarm signal at the first mobile device;
generating a first instruction for responding to the emergency event for the first mobile device based on the information and the identification information of the first mobile device;
receiving second identification information of a second mobile device located within a particular distance from a location of the emergency event;
generating a second instruction based on the second identification information of the second mobile device and the information; and
transmitting the first instruction to the first mobile device and transmitting the second instruction to the second mobile device.

28. The method of claim 27, wherein the information includes at least one of an alarm device identification (ID) or an emergency code of the emergency event.

29. The method of claim 27, wherein the identification information of the first mobile device includes at least one of a location, an identification number, or a callback number of the first mobile device.

30. The method of claim 27, wherein the identification information of the first mobile device includes context data associated with at least one of the first mobile device or the emergency event.

31. The method of claim 27, wherein generating the first instruction further includes comparing the received information and the identification information of the first mobile device with at least one of a map, an alarm device identification (ID), context data, or an emergency code.

32. The method of claim 27, wherein the alarm signal includes one of a siren or a bell.

33. The method of claim 27, wherein receiving the second identification information of the second mobile device includes determining that the second mobile device and the first mobile device are located within a first coverage area of one of a base station, an access point, or a cell tower.

34. The method of claim 27, wherein the first instruction includes at least one of a map indicating locations of an alarm device and the first mobile device or an evacuation route.

35. A server comprising:
a receiving unit configured to receive, from a first mobile device, information related to an emergency event and identification information of the first mobile device, wherein the information is included in an alarm signal at the first mobile device;
a processor configured to generate a first instruction for responding to the emergency event based on the information and the identification information of the first mobile device, wherein the processor is configured to generate the first instruction by comparing the information and the identification information of the first mobile device with at least one of a map, an alarm device identification (ID), context data, or an emergency code; and
a transmitting unit configured to transmit the first instruction to the first mobile device.

36. The server of claim 35, wherein the information includes at least one of the alarm device ID or the emergency code of the emergency event.

37. The server of claim 35, wherein the identification information includes at least one of a location, an identification number, or a callback number of the first mobile device.

38. The server of claim 35, wherein the identification information includes context data associated with at least one of the first mobile device or the emergency event.

39. The server of claim 35, wherein the alarm signal includes an audible sound and an audio watermark.

40. The server of claim 35, wherein the processor is further configured to generate a second instruction based on second identification information received from a second mobile device and the information, wherein the second mobile device is located within a particular distance from a location of the emergency event.

41. The server of claim 40, wherein the transmitting unit is further configured to transmit the second instruction to the second mobile device.

42. A server comprising:
a receiving unit configured to receive, from a first mobile device, information related to an emergency event and identification information of the first mobile device, wherein the information is included in an alarm signal;
a processor configured to generate a first instruction for responding to the emergency event based on the information and the identification information of the first mobile device, wherein the processor is configured to generate a second instruction based on second identification information of a second mobile device received from the second mobile device and the information, wherein the processor is further configured to determine that the first mobile device and the second mobile device is are located within a first coverage area of one of a base station, an access point, or a cell tower; and a transmitting unit configured to transmit the first instruction to the first mobile device and to transmit the second instruction to the second mobile device.

43. The server of claim 35, wherein the first instruction includes at least one of a map indicating locations of an alarm device and the first mobile device or an evacuation route.

44. A server comprising:
means for receiving, from a first mobile device, information related to an emergency event and identification information of the first mobile device, wherein the information is included in an alarm signal at the first mobile device, wherein the alarm signal includes a first signal and a second signal, and wherein the first signal includes an audible sound and the second signal includes at least one of an alarm device identification (ID) or an emergency code of the emergency event;
means for generating a first instruction for responding to the emergency event based on the information and the identification information of the first mobile device; and
means for transmitting the first instruction to the first mobile device.

45. The server of claim 44, wherein the means for generating the first instruction is further configured to generate the first instruction by comparing the received information and the identification information of the first mobile device with at least one of a map, the alarm device identification (ID), context data, or the emergency code.

46. The server of claim 44, wherein the means for generating the first instruction is further configured to generate a second instruction based on second identification information of a second mobile device received from the second mobile device and the information, wherein the second mobile device is located within a predetermined distance from a location of the emergency event.

47. The server of claim 46, wherein the means for transmitting the first instruction is further configured to transmit the second instruction to the second mobile device.

48. A computer-readable storage device comprising instructions for providing assistance in an emergency event, the instructions causing a processor of a server to perform operations comprising:
receiving, from a first mobile device, information related to the emergency event and identification information of the first mobile device, wherein the information is included in an alarm signal at the first mobile device, wherein the alarm signal includes a first signal and a second signal, and wherein the first signal includes an audible sound and the second signal includes at least one of an alarm device identification (ID) or an emergency code of the emergency event;
generating a first instruction for responding to the emergency event based on the information and the identification information of the first mobile device; and
initiating transmission of the first instruction to the first mobile device.

49. The medium device of claim 48, wherein generating the first instruction further includes:
comparing the received information and the identification information of the first mobile device with at least one of a map, the alarm device identification (ID), context data, or the emergency code.

50. The device of claim 49, further comprising:
receiving second identification information of a second mobile device located within a predetermined distance from a location of the emergency event;
generating a second instruction based on the second identification information of the second mobile device and the information; and
initiating transmission of the second instruction to the second mobile device.

51. A system comprising:
an alarm device configured to output an alarm signal including information related to an emergency event;
a first mobile device configured to receive the alarm signal and to transmit the information and identification information of the first mobile device;
a second mobile device operable to communicate with the first mobile device and configured to transmit second identification information of the second mobile device to the first mobile device and to receive, from the first mobile device, an instruction for responding to the emergency event; and
a server configured to receive the information and the identification information of the first mobile device, and to generate a first instruction for responding to the emergency event, wherein the server is configured to transmit the first instruction to the first mobile device.

52. The system of claim 51, wherein the server is further configured to:
receive second identification information of the second mobile device located within a predetermined distance from a location of the emergency event;
generate a second instruction based on the second identification information of the second mobile device and the information; and
transmit the second instruction to the second mobile device.

53. The system of claim 51, wherein the information includes at least one of an alarm device ID of an alarm device or an emergency code of the emergency event.

54. The system of claim 51, wherein the first mobile device is configured to transmit the second identification information of the second mobile device to the server, and wherein the server is configured to generate a second instruction for the second mobile device and to transmit the second instruction to the first mobile device.

55. A system for providing an instruction for responding to an emergency event, the system comprising:
a first mobile device configured to receive an alarm signal including information related to the emergency event; and
a second mobile device operable to communicate with the first mobile device, and configured to receive, from the first mobile device, the instruction for responding to the emergency event for the second mobile device, wherein the first mobile device is configured to generate the instruction based on second identification information of the second mobile device and the information, and wherein the second mobile device is operable to communicate directly with the first mobile device.

56. The system of claim 55, wherein the information includes at least one of an alarm device identification (ID) of an alarm device or an emergency code of the emergency event.

57. The system of claim 55, further comprising an alarm device configured to output the alarm signal indicating the emergency event.

58. A method comprising:

detecting an emergency event;

generating an alarm signal that includes information related to the emergency event, wherein the alarm signal includes a first signal and a second signal, and wherein the first signal includes an audible sound and the second signal includes at least one of an alarm device identification (ID) of an alarm device or an emergency code of the emergency event; and transmitting identification information via a network to a server to alert at least one mobile device within a particular distance from the alarm device of the emergency event.

59. The method of claim 58, wherein the identification information includes at least one of the alarm device identification (ID) or the emergency code for the emergency event.

60. The method of claim 58, wherein the at least on mobile device is operable to communicate with at least one network apparatus near to the alarm device.

61. A method, performed at a mobile device, for responding to an emergency event, the method comprising:

storing a predetermined emergency keyword in the mobile device based on a user input;

periodically receiving an input sound;

determining whether the input sound matches the predetermined emergency keyword indicating a request for assistance in the emergency event, wherein determining whether the input sound matches the predetermined emergency keyword includes:

determining a sound level of the input sound and, if the sound level of the input sound exceeds a threshold sound level, extracting a sound feature from the input sound; and identifying the input sound as the predetermined emergency keyword based on the sound feature;

if the input sound is determined to match the predetermined emergency keyword, verifying the request for the assistance, wherein verifying the request for the assistance includes:

outputting a query on emergency contact information or on whether to seek the assistance; and receiving a response to the query;

if the request for the assistance is verified, calling an emergency server and providing the emergency server with at least one of user information, location information, or context information of the mobile device;

receiving, from the emergency server, an instruction for responding to the emergency event; and outputting the instruction, wherein the user information includes at least one of a user name, a user social security number, a user phone number, a user photo, a user e-mail address, user health information, contact information, or mobile phone identification information, and includes communication information of a contact to be notified in the emergency event, and wherein the emergency server notifies the contact of the emergency event, wherein the location information indicates a location of the mobile device provided by a location tracking application in the mobile device, and wherein the context information includes information relating to environment or surroundings of the mobile device.

* * * * *